United States Patent
Jung

(10) Patent No.: US 8,947,269 B2
(45) Date of Patent: Feb. 3, 2015

(54) KEY INPUT UNIT AND KEY INPUT METHOD

(75) Inventor: Se-Woon Jung, Seoul (KR)

(73) Assignee: Da-Wun Choung, Seoul (KR)

( * ) Notice: Subject to any disclaimer, the term of this patent is extended or adjusted under 35 U.S.C. 154(b) by 1022 days.

(21) Appl. No.: 12/999,373

(22) PCT Filed: Apr. 3, 2009

(86) PCT No.: PCT/KR2009/001733
§ 371 (c)(1),
(2), (4) Date: Dec. 16, 2010

(87) PCT Pub. No.: WO2010/005159
PCT Pub. Date: Jan. 14, 2010

(65) Prior Publication Data
US 2011/0095917 A1   Apr. 28, 2011

(30) Foreign Application Priority Data
Jul. 8, 2008   (KR) .................. 10-2008-0065961

(51) Int. Cl.
| | | |
|---|---|---|
| H03K 17/94 | (2006.01) | |
| H03M 11/00 | (2006.01) | |
| G06F 3/033 | (2013.01) | |
| G09G 5/08 | (2006.01) | |
| G06F 3/02 | (2006.01) | |
| G09G 5/00 | (2006.01) | |
| G06T 11/00 | (2006.01) | |
| H04M 1/23 | (2006.01) | |

(Continued)

(52) U.S. Cl.
CPC .............. *H04M 1/23* (2013.01); *G06F 3/0234* (2013.01); *H01H 25/002* (2013.01)

USPC ............... 341/20; 341/22; 345/160; 345/168; 345/169; 345/467; 345/472; 715/859

(58) Field of Classification Search
CPC . G06F 3/0362; G06F 3/03548; G06F 1/1624; H03K 17/965; H03K 2217/96066
USPC ..................... 341/20, 22; 345/168, 169, 160, 345/467–472; 715/859
See application file for complete search history.

(56) References Cited

U.S. PATENT DOCUMENTS

| | | | | |
|---|---|---|---|---|
| 5,367,199 A | * | 11/1994 | Lefkowitz et al. | ............ 307/116 |
| 6,700,565 B2 | * | 3/2004 | Niiyama | ........................ 345/172 |
| 6,922,185 B2 | * | 7/2005 | Yamada et al. | ............... 345/157 |

(Continued)

FOREIGN PATENT DOCUMENTS

| | | |
|---|---|---|
| JP | 2007-052777 A | 3/2007 |
| KR | 10-2003-0010400 A | 2/2003 |

(Continued)

*Primary Examiner* — Jennifer Mehmood
*Assistant Examiner* — Emily C Terrell
(74) *Attorney, Agent, or Firm* — Birch, Stewart, Kolasch & Birch, LLP

(57) ABSTRACT

A digital processor having a key input unit and a key input method are disclosed. The key unit includes: a base that is fixed at the central position of the key unit; a slider that horizontally moves in parallel to the horizontal plane of the base by the user's operation; a frame that supports the slider so as to horizontally move; and a restoration unit that gives a resistive force against the horizontal movement of the slider and restores the horizontally-moved slider to an original position. Accordingly, it is possible to reduce the number of keys by increasing the number of information to be input by the use of a single key.

38 Claims, 18 Drawing Sheets

(51) Int. Cl.
*G06F 3/023* (2006.01)
*H01H 25/00* (2006.01)

(56) References Cited

U.S. PATENT DOCUMENTS

2003/0020694 A1 1/2003 Kim et al.
2004/0233159 A1* 11/2004 Badarneh ...................... 345/156
2007/0035515 A1 2/2007 Park et al.
2009/0009472 A1* 1/2009 Park ............................... 345/160
2009/0189789 A1* 7/2009 Oh .................................. 341/20
2011/0006995 A1* 1/2011 Jo ................................. 345/169

FOREIGN PATENT DOCUMENTS

KR 10-2004-0068514 A 7/2004
KR 10-2008-0025371 * 3/2008

* cited by examiner

FIG. 7
(a)
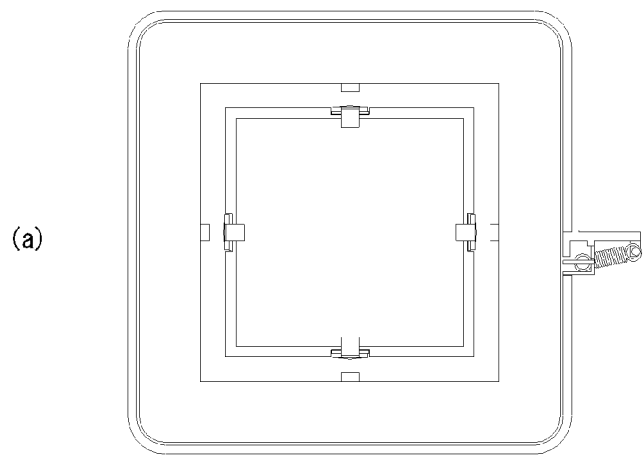
(b)
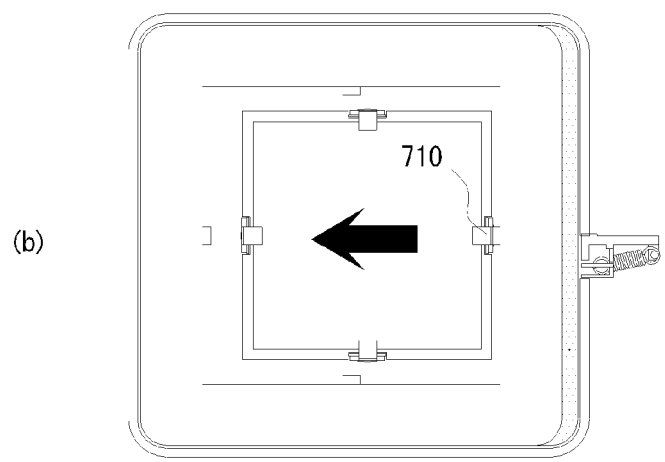
(c)
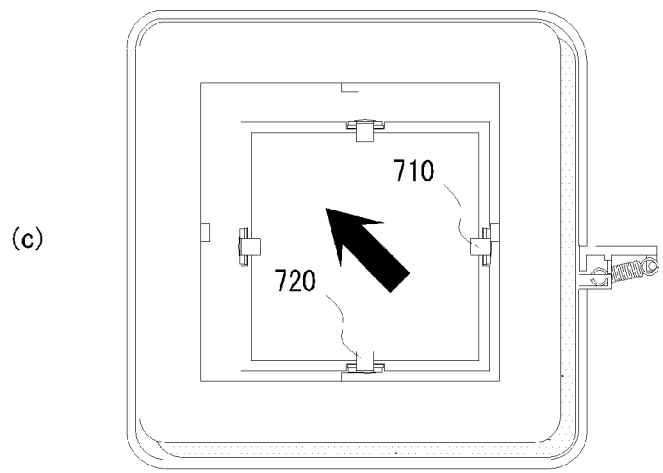

FIG. 17
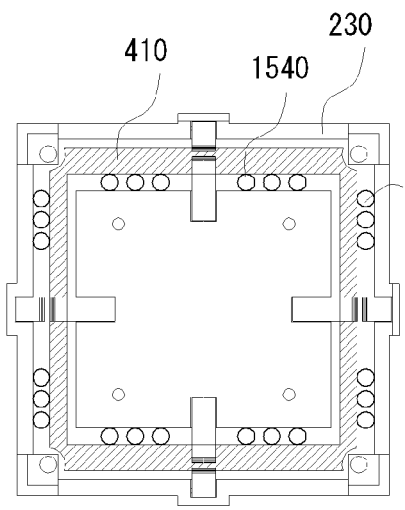
(a)
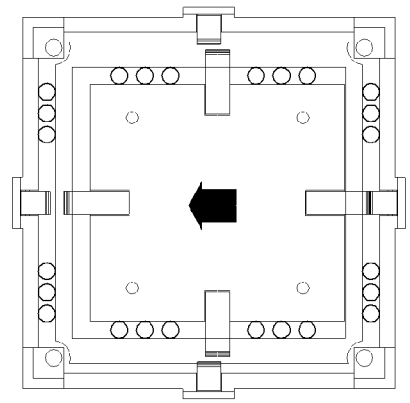
(b)
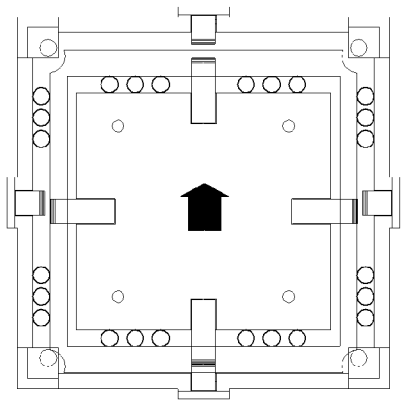
(c)
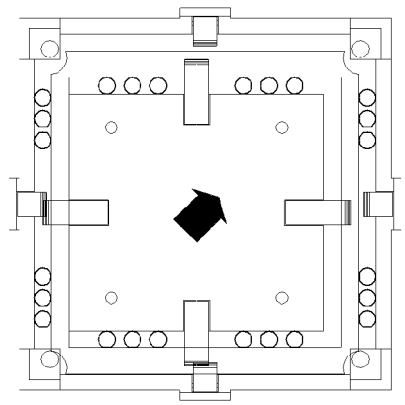
(d)

KEY INPUT UNIT AND KEY INPUT METHOD

CROSS REFERENCE

This application is based on and claims priority under 35 USC 119 from PCT Application No. PCT/KR09/01733, filed Apr. 3, 2009.

BACKGROUND

1. Field of the Invention

The present invention relates to a key input unit, a digital processor having the key input unit, and a key input method.

2. Description of the Related Art

A mobile communication terminal as an example of a digital processor includes a key input device including plural functional keys or keys such as keys for inputting characters and numerals, functional keys for starting and ending a call, and keys for selecting a menu item.

The keys serve to perform functions essential to input a user's command and are inevitable for a mobile communication terminal.

However, the keys serve as a limit factor in the tendency to decrease the size of the digital processor such as a mobile communication terminal. That is, the decrease in size of an input device such as a keyboard and a key pad used in a digital processor (such as a PC (Personal Computer, a notebook computer, a mobile communication terminal, and a PDA (Personal Data Assistant)) is limited, thereby making it difficult to reduce the size of the digital processor.

A touch screen used in a mobile communication terminal or a PDA can accomplish a decrease in size, but has a problem in that its input speed is low and erroneous inputs are often caused.

SUMMARY

An advantage of some aspects of the invention is that it provides a digital processor including a key input unit which can reduce the number of keys by increasing the number of information to be input by the use of a single key, and a key input method.

Another advantage of some aspects of the invention is that it provides a digital processor including a key input unit which can maintain an operation feeling (tact sense) of a key even when the single key performs plural functions (for example, selectively inputting plural characters/functions), and a key input method.

Another advantage of some aspects of the invention is that it provides a digital processor including a key input unit which can enhance a recognition rate of information input by the use of a key or a user's operation command and a key input method.

Another advantage of some aspects of the invention is that it provides a digital processor including a key input unit which can decrease the number of keys to decrease the size of a digital processor and/or to increase a display area.

Other advantages of the invention will be easily understood from the following description.

According to an aspect of the invention, there is provided a key unit for inputting a user's operation command corresponding to a moving direction and a digital processor including the key unit.

The key unit includes: a base that is fixed at the central position of the key unit; a slider that horizontally moves in parallel to the horizontal plane of the base by the user's operation; a frame that supports the slider so as to horizontally move; and a restoration unit that gives a resistive force against the horizontal movement of the slider and restores the horizontally-moved slider to an original position.

The frame may be disposed between the base and the slider and the base and the slider may come in vertical contact with each other along outer side surfaces of the frame.

The key unit may further include an information plate coupled to the top of the slider so as to sense the vertical movement of the key unit by the user's operation.

The information plate may be formed of one or more of a touch pad, a touch screen, a PCB (Printed Circuit Board), and an FPC (Flexible Printed Circuit).

The restoration unit may include: an elastic band that surrounds both the outer side surfaces of the base and the slider in a C shape; and a movement sensing unit that fixes both ends of the elastic band.

The key unit may further include: an elastic band that is inserted into a C-shaped groove formed in the base and the slider so as to surround both the base and the slider; and a movement sensing unit that fixes both ends of the elastic band.

The key unit may further include n sensors (where n is a natural number) that are arranged in an inner peripheral portion of the slider formed in a loop shape. Then sensors may be activated in response to a sensing signal from the movement sensing unit which has sensed the elongation of the elastic band resulting from the horizontal movement of the slider.

The central portion of the base may be higher than the outer peripheral portion and the central portion is inserted into an inner hole of the slider formed in a loop shape.

The restoration unit may be an elastic body that separates the outer peripheral portion of the central portion from the inner peripheral portion of the slider by a constant distance.

The key unit may further include n sensors (where n is a natural number) that are arranged in the outer peripheral portion of the central portion or the inner peripheral portion of the slider.

The sensors may be one or more of a contact sensor, a pressure sensor, and a distance sensor.

The movement sensing unit may be one or more of a tact switch, a tension sensor, a variable resistor, and an elastic terminal.

The elastic band may be formed of a material of which the elongation ratio is 0 (zero) or equal to or less than a predetermined value.

The key unit may further include a press sensing unit that senses a press state corresponding to the vertical movement of the key unit and the n sensors may be activated in response to a press state sensing signal output from the press sensing unit.

The key unit may further include: a key cover that is coupled to the slider and disposed above the key unit; and a touch sensing unit that senses a user's touch of the key cover. Here, the n sensors may be activated in response to a touch state sensing signal output from the touch sensing unit.

Supports may be formed at predetermined positions in the outer portion of the slider and at least one key cover may be disposed in a space defined by the supports.

Supports may be formed at predetermined positions in the outer portion of the slider and the supports may be inserted into and coupled to a groove formed in at least one key cover.

Holes or protrusions and supports may be formed at predetermined positions in the slider, at least one key cover may be disposed in a space defined by the supports, and protrusions or holes formed in the bottom of the key cover may be coupled to the holes or protrusions of the slider.

The key unit may further include at least one outer horizontal bearing disposed at a predetermined position between the frame and the slider.

The key unit may further include at least one inner horizontal bearing disposed at a predetermined position between the frame and the central portion of the base and the inner horizontal bearing and the outer horizontal bearing may be located in the opposite directions from the central portion.

A magnet that restores one or more of the inner horizontal bearing, the outer horizontal bearing, and a vertical bearing disposed between the bottom of the slider and the top surface of the base, which have moved, to the original position may be disposed below the base.

According to another aspect of the invention, there is provided a digital processor having at least one key for inputting a user's operation command corresponding to a moving direction, including: a key unit; and a control unit that recognizes the opposite direction of arrangement positions or the opposite direction of a vector sum of one or more sensors outputting a sensing signal as the moving direction of the slider on the basis of the sensing signal input from the key unit. Here, the key unit includes: a base that is fixed at the central position of the key unit; a slider that horizontally moves in parallel to the horizontal plane of the base by the user's operation; a frame that supports the slider so as to horizontally move; and a restoration unit that gives a resistive force against the horizontal movement of the slider and restores the horizontally-moved slider to an original position.

The restoration unit may include: an elastic band that surrounds both the outer side surfaces of the base and the slider in a C shape; and a movement sensing unit that fixes both ends of the elastic band.

The digital processor may further include n sensors (where n is a natural number) that are arranged in an inner peripheral portion of the slider formed in a loop shape.

The restoration unit may include: an elastic band that is inserted into a C-shaped groove formed in the base and the slider so as to surround both the base and the slider; and a movement sensing unit that fixes both ends of the elastic band.

The frame may be disposed between the base and the slider and the base and the slider may come in vertical contact with each other along outer side surfaces of the frame.

The digital processor may further include an information plate coupled to the top of the slider so as to sense the vertical movement of the key unit by the user's operation.

The central portion of the base may be higher than the outer peripheral portion and the central portion may be inserted into an inner hole of the slider formed in a loop shape.

The restoration unit may be an elastic body that separates the outer peripheral portion of the central portion from the inner peripheral portion of the slider by a constant distance.

The digital processor may further include n sensors (where n is a natural number) that are arranged in the outer peripheral portion of the central portion or the inner peripheral portion of the slider.

The n sensors are activated in response to a sensing signal from the movement sensing unit which has sensed the elongation of the elastic band resulting from the horizontal movement of the slider.

The movement sensing unit may be one or more of a tact switch, a tension sensor, a variable resistor, and an elastic terminal.

The elastic band may be formed of a material of which the elongation ratio is 0 (zero) or equal to or less than a predetermined value.

The digital processor may further include a press sensing unit that senses a press state corresponding to the vertical movement of the key unit and the n sensors may be activated in response to a press state sensing signal output from the press sensing unit.

The digital processor may further include: a key cover that is coupled to the slider and disposed above the key unit and a touch sensing unit that senses a user's touch of the key cover. Here, the n sensors may be activated in response to a touch state sensing signal output from the touch sensing unit.

Supports may be formed at predetermined positions in the outer portion of the slider and at least one key cover may be disposed in a space defined by the supports.

Supports may be formed at predetermined positions in the outer portion of the slider and the supports may be inserted into and coupled to a groove formed in at least one key cover.

Holes or protrusions and supports may be formed at predetermined positions in the slider, a key cover may be disposed in a space defined by the supports, and protrusions or holes formed in the bottom of the key cover may be coupled to the holes or protrusions of the slider.

The digital processor may further include at least one outer horizontal bearing disposed at a predetermined position between the frame and the slider.

The digital processor may further include at least one inner horizontal bearing disposed at a predetermined position between the frame and the central portion of the base, and the inner horizontal bearing and the outer horizontal bearing may be located in the opposite directions from the central portion.

A magnet that restores one or more of the inner horizontal bearing, the outer horizontal bearing, and a vertical bearing disposed between the bottom of the slider and the top surface of the base, which have moved, to the original position may be disposed below the base.

According to another aspect of the invention, there is provided a recording medium having recorded thereon a program of command words which can be executed by a digital processor so as to carry out a key input method.

The recording medium has recorded thereon a program which can be read by a digital processor and in which command words executable by the digital processor are materially described so as to carry out a key input method, the key input method including steps of: receiving a horizontal movement start signal of a slider; receiving a sensing signal from one or more sensors disposed in a key unit; and recognizing the opposite direction of arrangement positions or the opposite direction of a vector sum of one or more sensors outputting the sensing signal as the moving direction of the slider. Here, the key unit includes: a base that is fixed at the central position of the key unit; the slider that horizontally moves in parallel to the horizontal plane of the base by the user's operation; a frame that supports the slider so as to horizontally move; and a restoration unit that gives a resistive force against the horizontal movement of the slider and restores the horizontally-moved slider to an original position.

The sensors disposed in the key unit may be activated when the horizontal movement start signal of the slider is received.

BRIEF DESCRIPTION OF THE DRAWINGS

FIG. 7 is a diagram illustrating operations of the key input unit according to the embodiment of the invention

FIG. 17 is a diagram illustrating operations of the key input unit according to still another embodiment of the invention.

DESCRIPTION OF EXEMPLARY EMBODIMENTS

Figure 1:
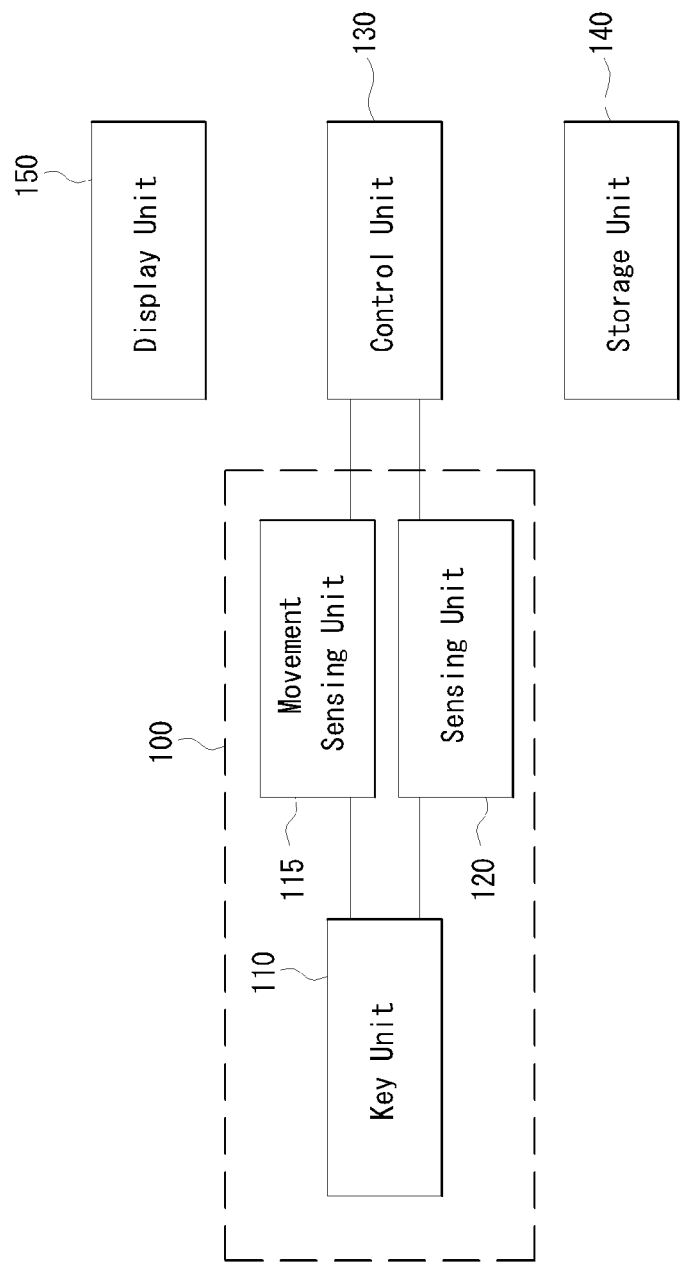
FIG. 1 is a block diagram illustrating a digital processor according to an embodiment of the invention.

The above-mentioned goals, features, and advantages will become apparent from the following detailed description with reference to the accompanying drawings.

The invention can be variously modified in various forms and specific embodiments will be described and shown in the drawings. However, the embodiments are not intended to limit the invention, but it should be understood that the invention includes all the modifications, equivalents, and replacements belonging to the spirit and the technical scope of the invention. When it is determined that detailed description of known techniques involved in the invention makes the gist of the invention obscure, the detailed description will be omitted.

Terms such as "first" and "second" can be used to describe various elements, but the elements are not limited to the terms. The terms are used only to distinguish one element from another element. For example, without departing from the scope of the invention, a first element may be named a second element and the second element may be named the first element, similarly. The term, "and/or", includes a combination of plural elements or any one of the plural elements.

If it is mentioned that an element is "connected to" or "coupled to" another element, it should be understood that still another element may be interposed therebetween, as well as that the element may be connected or coupled directly to another element. On the contrary, if it is mentioned that an element is "connected directly to" or "coupled directly to" another element, it should be understood that still another element is not interposed therebetween.

The terms used in the following description are used to merely describe specific embodiments, but are not intended to limit the invention An expression of the singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

So long as they are not defined differently, all the terms used therein, which include technical or scientific terms, have the same meanings as generally understood by those skilled in the art. The terms defined in dictionaries used in general should be analyzed to have the same meaning as in the contexts of the related art, but the terms should not be analyzed ideal or excessively formal.

Hereinafter, exemplary embodiments of the invention will be described in detail with reference to the accompanying drawings. Like or corresponding elements are referenced by like reference numerals regardless of the drawing number and repeated description thereof is not made.

In the following description of exemplary embodiments of the invention with reference to the accompanying drawings, a case where each key can horizontally move in four directions will be mainly described, but each key can horizontally move inn (where n is a natural number equal to or greater than 2) directions (for example, 8 directions) under the same technical spirit and the horizontal movement direction can be sensed to input corresponding user commands (for example, one or more of selecting characters, numerals, or operation modes, executing applications, and control commands).

Figure 2:
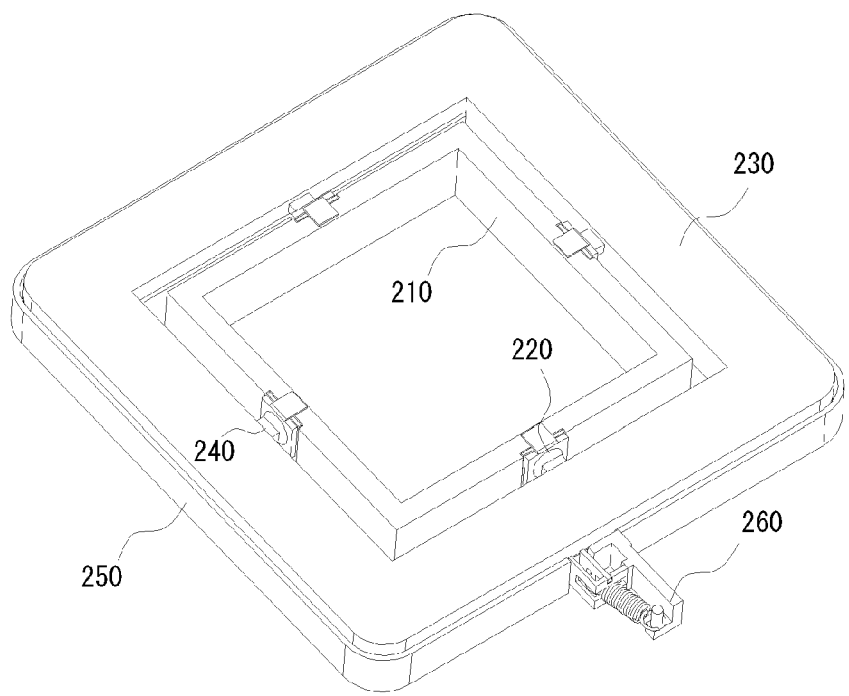
FIG. 2 is a perspective view of a key input unit according to the embodiment of the invention.
Figure 3:
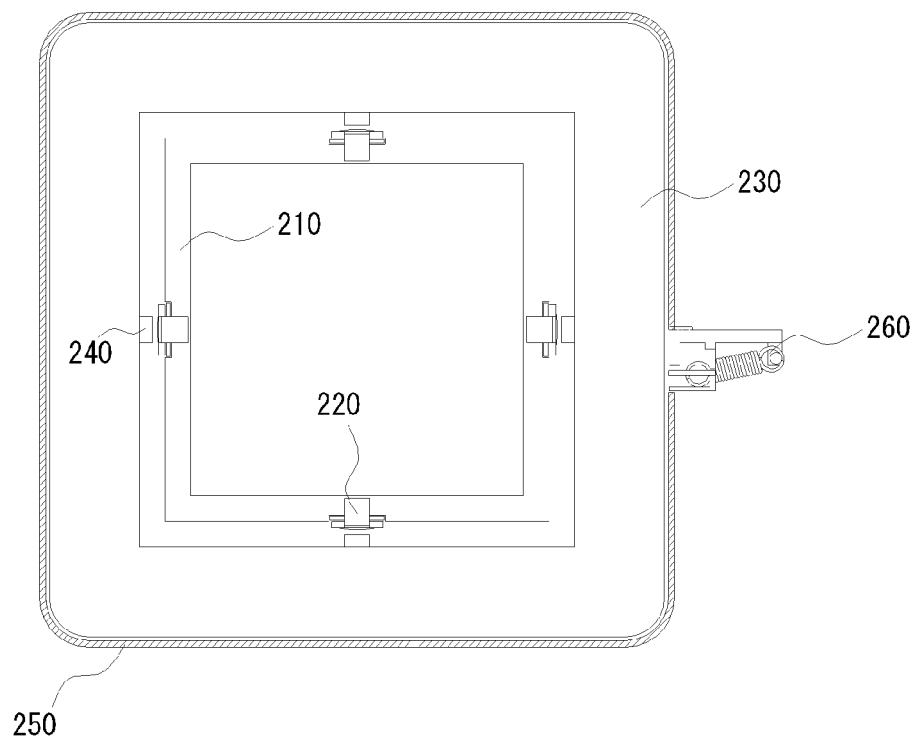
FIG. 3 is a front view of the key input unit according to the embodiment of the invention.
Figure 4:
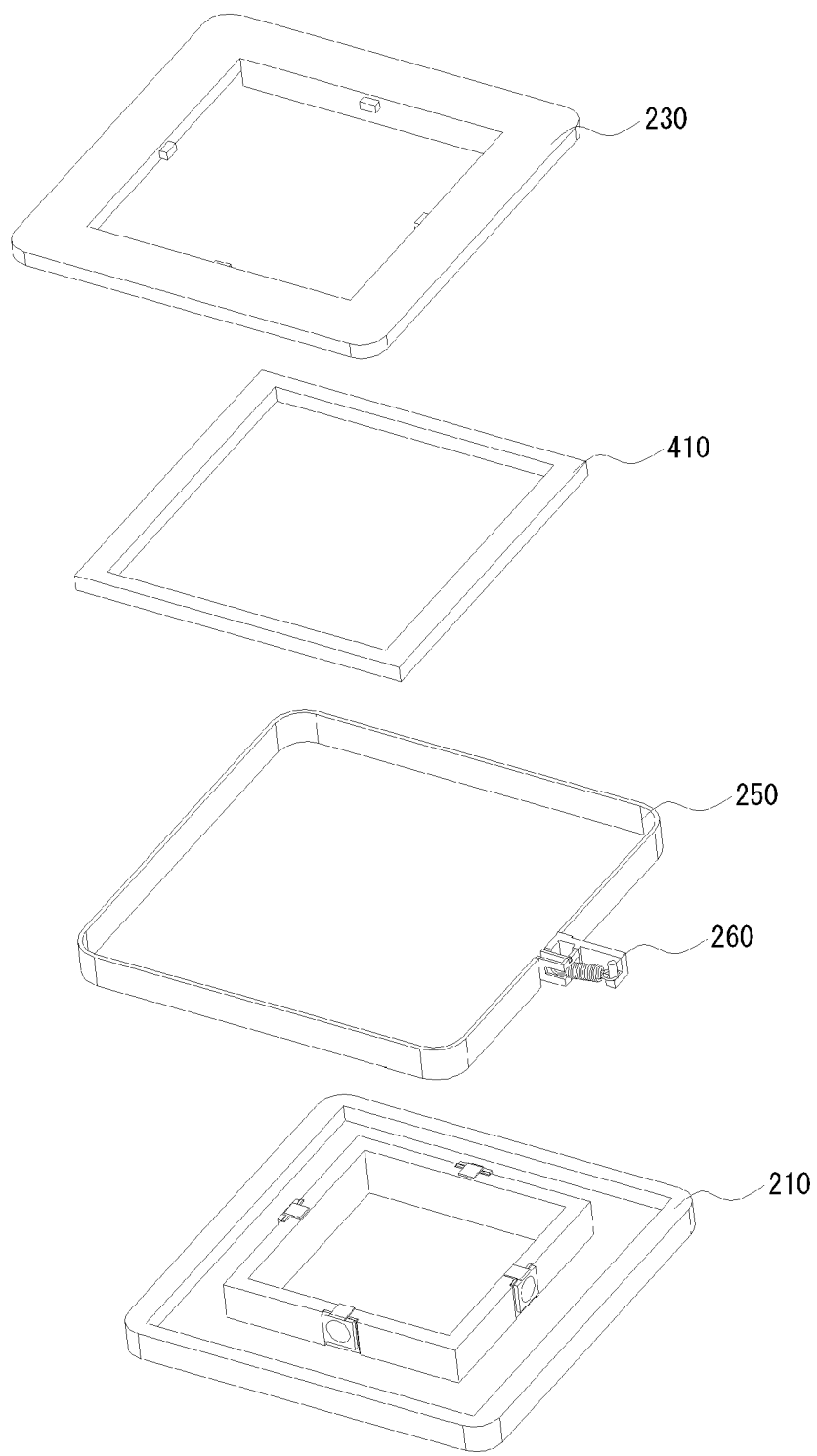
FIGS. 4 and 5 are coupling perspective views of the key input unit according to the embodiment of the invention.
Figure 5:
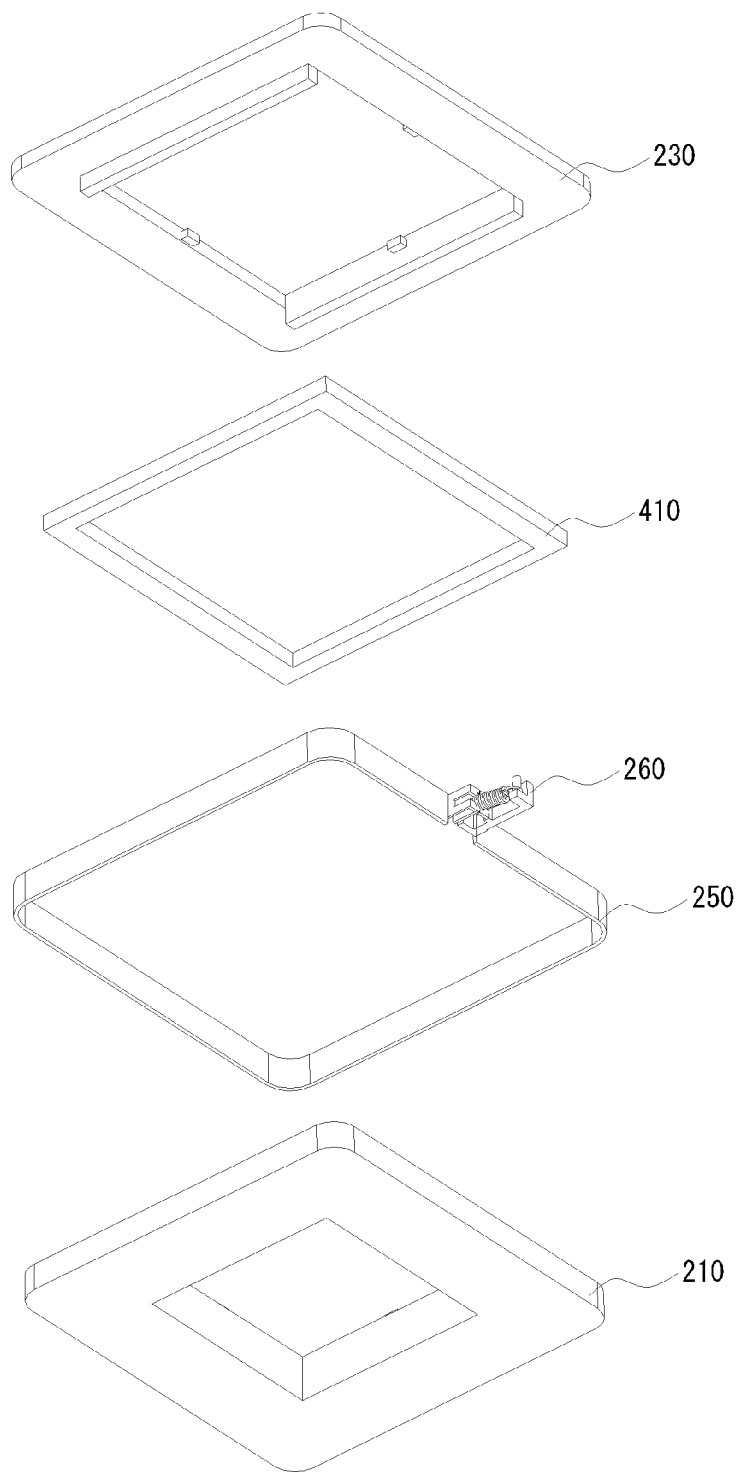
Figure 6:
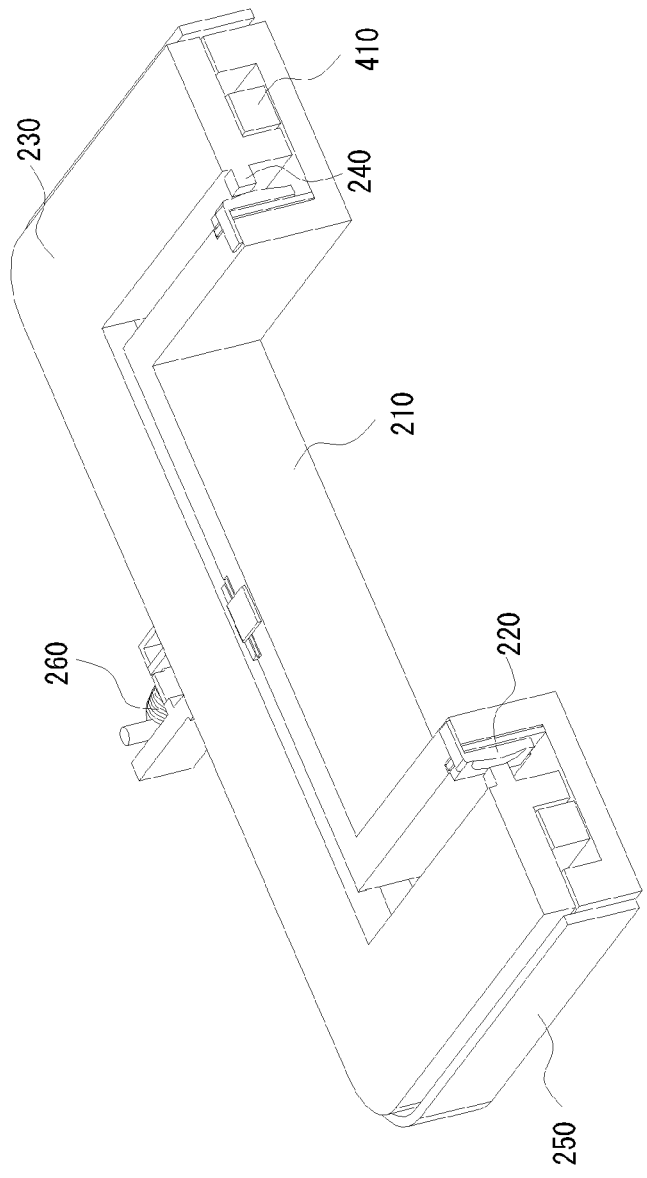
FIG. 6 is a sectional view of the key input unit according to the embodiment of the invention.

FIG. 1 is a block diagram illustrating the configuration of a digital processor according to an embodiment of the invention. FIG. 2 is a perspective view of a key input unit according to the embodiment of the invention. FIG. 3 is a front view of the key input unit according to the embodiment of the invention. FIGS. 4 and 5 are coupling perspective views of the key input unit according to the embodiment of the invention. FIG. 6 is a sectional view of the key input unit according to the embodiment of the invention.

Referring to FIG. 1, a digital processor includes a key input unit 100, a control unit 130, a storage unit 140, and a display unit 150. The key input unit 100 includes a key unit 110, a movement sensing unit 115, and a sensing unit 120. The number of key input units 100 corresponds to the number of keys operating by a key input method according to the invention.

The key unit 110 is formed to horizontally move in a space in a groove (that is, a predetermined space defined by the inner peripheral surface and the bottom surface) formed in one side surface of the digital processor. A circuit device (such as a PCB, a FPC, and a touch screen module) included in the key unit 110 can receive a vertical input signal while horizontally moving along with the key unit 110.

The key unit 110 may be formed to continuously horizontally move so as to recognize and/or input a rotational movement.

The movement sensing unit 115 senses the moving direction of a slider 230 disposed around a base 210 (see FIG. 2) and outputs the sensed information.

Referring to FIG. 2, the movement sensing unit 115 includes an elastic band 250 surrounding both the outer side surfaces of a base 210 and a slider 230 and a tact switch 260 fixing both ends of the elastic band 250.

Although not shown, the slider 230 may be coupled to a key cover (key top) disposed on the top surface of the key input unit 100 and may move in the direction in which a user moves the key cover. In order to prevent a user's finger from sliding, one or more of a special glass, a film, a PC (Poly Carbonate), an ABS (Acrylonitrile Butadiene Styrene), an acryl, and other plastic materials may be attached to the top surface of the key cover (and/or the touch screen module), or the top surface may be coated with special dyes. The key cover can be formed of one of SUS, other metals, PC, ABS, PC/ABS, other plastics, rubber, and silicon or combinations thereof (for example, the top surface is formed of rubber and the underlying layer is formed of SUS).

Here, the elastic band 250 is formed of a material (such as rubber) with an elongation ratio of 0 or equal to or greater than a reference value against an applied force. For example, when it is assumed that the original length of the elastic band 250 is 186.8 mm, the reference value may be a value limiting the maximum length limit to 193.7 mm. The elongation ratio can be determined and embodied depending on designs.

A coil spring (see FIG. 8) is provided to the tact switch 260 fixing the elastic band 250. Accordingly, even when the elongation ratio is 0 (or the minimum limit) and a force in a specific direction is applied to the elastic band 250 due to the horizontal movement of the slider 230, the length of the coil spring can be also elongated, which gives the same advantage as when the elongation ratio of the elastic band 250 is a predetermined value. In this case, since the elongation ratio of the elastic band 250 is 0 (or the minimum limit), it is possible to prevent an erroneous operation of a signal counter due to the length variation of the elastic band 250.

The elastic band 250 has elasticity so that the slider 230 can horizontally move in a direction with an applied force (that is, the force which a user applies to the slider so as to horizontally move the key) and then can be restored to the original position. A belt or the like may be used instead of the elastic band 250 for the same purpose. Since the elastic band 250 has elasticity but its elongation ratio is limited, the slider 230 can be rapidly restored to the original position.

The material of the elastic band 250 is not particularly limited as long as it is flexible. Here, the material can be restricted to materials not being elongated with the temperature and the time. For example, the elastic band may be formed of a flexible printed circuit (FPC) board. In this case, the elastic band itself can process signals even without using a particular signal processing switch.

Although the shape of the elastic band 250 shown in the drawing is rectangular, the shape of the elastic band 250 is not particularly limited as long as it is matched with the purpose of the elastic band 250 in the invention.

Figure 8:
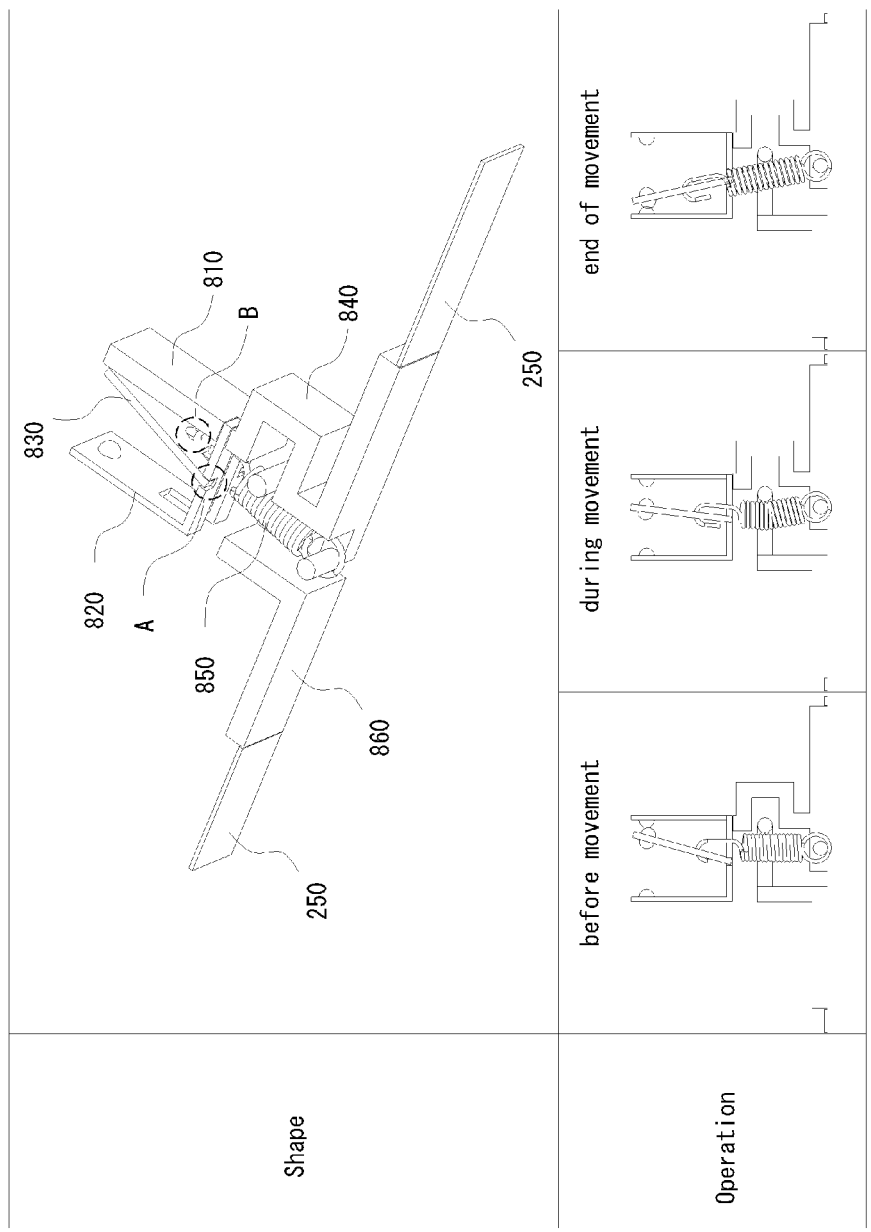
FIG. 8 is a diagram illustrating the shape and operation of a tact switch according to the embodiment of the invention.

The tact switch 260 serves to maintain the key operation feeling (tactile sense) well and also serves as a signal counter which causes the control unit 130 to sense the horizontal movement of the slider 230 by ON/OFF of a contact point at the time of the horizontal movement of the slider 230 (see FIG. 8). When the tact switch 260 performs only the function of maintaining the operation feeling well, a particularly signal counter may be further provided.

The tact switch 260 is activated when the length of the elastic band 250 increases due to the applied force. That is, the tact switch 260 is activated when the slider horizontally moves in one direction of north, south, east, west, and diagonal directions.

As shown in the drawing, it is possible to input a variety of information and/or to select functions by the horizontal movement of a key and it is also possible to cause a single tact switch 260 to maintain an operation feeling and to serve as a signal counter.

FIG. 2 shows that the tact switch 260 is exposed to the outside. However, the position of the tact switch 260 is not particularly limited as long as it can recognize the horizontal movement (that is, the positional deviation between the slider 230 and the base 210) of the slider 230.

The movement sensing unit 115 is not limited to the above-mentioned configuration and may be embodied, for example, by an elastic terminal. Some examples of the movement sensing unit 115 will be described later with reference to FIGS. 11 to 14.

The sensing unit 120 outputs a sensing signal for causing the control unit 130 to recognize the moving direction of the slider 230.

In FIG. 2, four pressure sensors 220 as the sensing unit 120 are arranged in four directions of the base 210. However, the number of pressure sensors 220 constituting the sensing unit 120 is not limited to four, but may be increase or decrease as needed. In order to easily apply pressures to the pressure sensors 220 at the time of the horizontal movement of the slider 230, protrusions 240 may be formed on the side surfaces of the slider 230 facing the pressure sensors 220.

When the pressure sensors 220 are arranged on the inner peripheral surfaces of the slider 230, the protrusions 240 may be arranged on the corresponding outer peripheral surface of the base 210.

When the contact surfaces of the pressure sensors 220 protrude externally (for example, when the pressure sensors are formed of folk type terminals or terminals having a spring function), the protrusions 240 may not be provided.

The shape of the sensing unit 120 is not limited to the above-mentioned configuration. Some examples of the sensing unit 120 will be described later with reference to FIG. 12.

Referring to FIG. 1 again, the control unit 130 senses the movement of the slider 230 with reference to a movement sensing signal input from the movement sensing unit 115 and senses the moving direction of the slider 230 on the basis of the sensing signal input from the sensing unit 120. Then, the control unit 130 controls the digital processor to operate in accordance with the recognized moving direction of the slider 230.

The storage unit 140 is a storage space for storing data and the like required for the operation of the digital processor and the display unit 150 outputs the operation state of the digital processor under the control of the control unit 130.

FIG. 3 shows a plan view of the key input unit, FIGS. 4 and 5 shows coupling perspective views of the key input unit, and FIG. 6 shows a sectional view of the key input unit. FIG. 4 is a coupling perspective view as it is viewed from the top side and FIG. 5 is a coupling perspective view as it is viewed from the bottom side.

As shown in the drawings, the key input unit 100 includes a base 210 of which the inside protrudes and which does not horizontally move from its position, a slider 230 that is disposed around the protruding portion of the base 210 and on the base 210 so as to pass and expose the protruding portion of the base 210, an elastic band 250 that surrounds both the outer side surfaces of the base 210 and the slider 230 stacked in a two-layer structure, and a tact switch 260 that fixes both ends of the elastic band 250. The key input unit may further include a frame 410 that is disposed above the inner surface of the base 210 and below the inner surface of the slider 230 and that causes the slider 230 and the base 210 to relatively move perpendicular to each other.

When the key input unit 100 includes the frame 410 that causes the slider 230 and the base 210 to move perpendicular to each other, the base 210 may be formed so that the inside (central portion) thereof does not protrude. Depending on the shape of the frame 410, the inside may be dented or all or a part of a guide portion may be cut out.

For example, in order to prevent dust from being introduced from the outside or to completely pack lubricant with high viscosity, the elastic band 250 surrounding both the outer side surfaces may be disposed inside the slider 230 and the base 210.

One or more of pressure sensors 220 are arranged on the peripheral surface of the base 210 and protrusions for effectively pressurizing the pressure sensors 220 are arranged on the corresponding inner peripheral surface of the slider 230. As described above, the protrusions 240 are not essential and may be changed in various forms depending on the type of sensors and the method of recognizing the horizontal movement direction.

Although not shown in the drawings, the slider may be coupled to an information plate for inputting vertical input information (for example, click and contact operations). The information plate may be formed of, for example, a touch pad, a touch screen, a PCB (Printed Circuit Board), and an FPC (Flexible Printed Circuit). For example, a touch screen module or a combination component of a touch screen module and a PCB instead of a key pad PCB may be coupled to the slider 230. The PCB or the FPC coupled to the slider may be combined with a specification for processing a vertical input, such as a metal dome, a poly dome, and an EL dome (that is, a structure in which a flexible electroluminescence element is attached to a metal dome).

Since the information plate is provided, it is possible to conveniently perform an input operation even in a small touch screen of a display unit of a mobile communication terminal or a PDA, by touching and moving a small button in a specific direction to output the corresponding signal.

A mobile communication terminal or a PDA having a touch screen function has a small display area for the purpose of a decrease size and an increase in portability. Accordingly, an input touch area through which a user can input commands with a touch has to decrease. However, according to the invention, it is possible to enlarge the input touch area by mounting a touch screen module instead of the PCB on the slider 230 and it is possible to input signals different depending on the directions (for example, the key area is set as a combination of 8 key areas of the existing touch pad when 8 directions can be recognized by moving the touched area in a specific direction. Accordingly, even when the touch screen has the same size, the input touch area for a finger can be enlarged.

By applying, for example, a special glass or film or other dyes onto the touch screen at the time of employing the touch screen module, it is possible to prevent the frictional force between the touch screen and the finger from decreasing.

In this embodiment, it is described that the slider 230 is stacked on the base 210. However, the slider 230 may be located inside the base 210. The shape of the slider 230 is not greatly changed, in consideration that the layout of the information plate does not greatly depends on the number of buttons or the like and the shape of the slider contributes to the mounting of the information plate. On the contrary, since the base 210 is coupled to a screw boss, a hook, or a fixing protrusion, the shape of the base may be greatly changed depending on the type, structure, and shape of the digital processor. In some cases, the frame 410, the slider 230, and the like may be disposed inside the base 210.

An opening may be formed in the base 210, all or a part of the frame 410 may be inserted into and fixed to the opening, and the slider 230 may be disposed inside the frame 410.

FIG. 7 is a diagram illustrating the operation of the key input unit according to the embodiment of the invention. FIG. 8 is a diagram illustrating the shape and the operation state of the tact switch according to the embodiment of the invention.

(a) of FIG. 7 shows a state before the slider 230 horizontally moves, (b) of FIG. 7 shows a state where the slider 230 horizontally moves to the west, and (c) of FIG. 7 shows a state where the slider 230 horizontally moves to the north-west In (b) of FIG. 7 where the slider 230 horizontally moves to the west, a pressure is applied to the pressure sensor 710 disposed on the east of the base 210 due to the horizontal movement of the slider 230. The pressure sensor 710 outputs a sensing signal and the control unit 130 receives the sensing signal and recognizes that the slider 230 moves to the opposite side (that is, west) of the pressure sensor 220 outputting the sensing signal. This will be easily understood, by considering that the pressure sensor 710 outputting the sensing signal is disposed on the opposite side in the horizontal movement direction of the slider 230.

In (b) of FIG. 7 where the slider 230 horizontally moves to the north-west the pressures are applied to the pressure sensors 710 and 720 disposed on the east and the south of the base 210 due to the horizontal movement of the slider 230. The pressure sensors 710 and 210 output a sensing signal and the control unit 130 receives the sensing signal and recognizes that the slider 230 moves to the opposite side (that is, in the opposite direction of the vector sum direction and to the north-west) of the pressure sensors 710 and 720 outputting the sensing signal.

In (c) of FIG. 7, the base 210 is located at the original position and only the slider moves, whereby the elastic band 250 surrounding both the outer side surfaces of the base 210 and the slider 230 is elongated. Since the elongation ratio of the elastic band 250 is limited, a force is applied to the tact switch 260 fixing both ends of the elastic band 250 and a contact point with which the lever of the tact switch 260 comes in contact varies. In (b) and (c) of FIG. 7, the degree of deviation of the slider 230 and the base 210 is shown due to the movement of the slider.

FIG. 8 shows the shape and the operation of the tact switch 260. The operation states shown in FIG. 8 represent an example of the restoration of the tact switch 260 and the coil spring 850. The operation states are not limited to the example, but various methods of restoring the tact switch 260 and the like may be employed.

As shown in FIG. 8, the tact switch 260 includes a start contact portion 810, an end contact portion 820, a movable contact portion 830, a tact switch base 840, a coil spring 850, and a trigger 860. Since the elastic band 250 is in contact with both the outer side surfaces of the base 210 and the slider 230, the bottom surfaces of the trigger 860 and the tact switch base 840 fixing both ends of the elastic band 250 are in contact with the outer sides surfaces of the base 210 and the slider 230.

Circle A represents a pivot point about which the movable contact portion 830 swings, where the movable contact portion 830 swings about the pivot point to rapidly provides an operation feeling (tactile sense) of the key. Circle B represents the position of the central hole of the coil spring 850.

Before the slider 230 moves in any direction, the movable contact portion 830 is in contact with the start contact portion 810 and the coil spring 850 pulls the movable contact portion 830.

When the slider 230 starts moving in any direction, a force in the moving direction the slider 230 is applied to the elastic band 250 to pull the trigger 860, a force in the pulling direction of the trigger 860 is applied to the coil spring 850 disposed between the trigger 860 and the protrusion due to the pulling of the trigger 860 (that is, because the tact switch base 840 and the trigger 860 are separated from each other), whereby the movable contact portion 830 swings toward the end contact portion 820. Referring to the operation state shown in FIG. 8, since the force is applied to the coil spring until the movable contact portion 830 comes in contact with the end contact portion 820 and the coil spring 850 cannot be deformed any more, the shape of the coil spring 850 in the course of the movement of the slider 230 is different from the other states.

When the slider 230 starts its movement and the movable contact portion 830 is separated from the start contact portion 810, information representing the movement of the slider 230 is input to the control unit 130 and the control unit 130 recognizes the movement of the slider 230.

When the movable contact portion 830 comes in contact with the end contact portion 820, the corresponding signal is sent to the control unit 130 to recognize the end of the horizontal movement of the slider 230. By using the sensing signals input from the sensors hitherto, the control unit 130 recognizes the moving direction of the slider 230. That is, the tact switch 230 serves as a signal counter form the time point when the movable contact portion 830 ends the contact with the start contact portion 810 to the time point when the movable contact portion 830 starts its contact with the end contact portion 820 or the time point when the movable contact portion 830 does not start the contact with the end contact portion 820 but starts the contact with the start contact portion 810 again. However, as described above, the tact switch 260 and the signal counter may be individually embodied and may be coupled to the elastic band 250.

When the user detach his or her finger from the slider 230 after the movable contact portion 830 comes in contact with the end contact portion 820, the influence of the force of the user's finger on the trigger 860 having been pulled due to the movement (or the increase in length) of the elastic band 250 resulting from the movement of the slider 230 disappears.

Therefore, the coil spring 850 will be restored to the position where the length thereof is the shortest (that is, the position where the movable contact portion 830 comes in contact with the start contact portion 810) (At this time, when the length of the elastic band 250 increases with the elongation ratio, the length is restored to the original length). That is, the trigger 860 fixed to an end of the coil spring 850 is also restored to the original position with the restoration of the coil spring 850 to the original position, and the slider 230 is also restored to its original position with the restoration of the elastic band 250 resulting form the restoration of the trigger 860.

The method of sensing the moving direction of the slider 230 and the method of inputting sensing information will be described in detail later with reference to FIGS. 9 and 10.

In the drawing, the coil spring 850 is used to cause the tact switch 260 to give the operation feeling (tactile sense) to the user, but a leaf spring, a rubber (including silicons), and a magnet may be further used. The material is not particularly limited as long as it can accomplish the same purpose.

Figure 9:
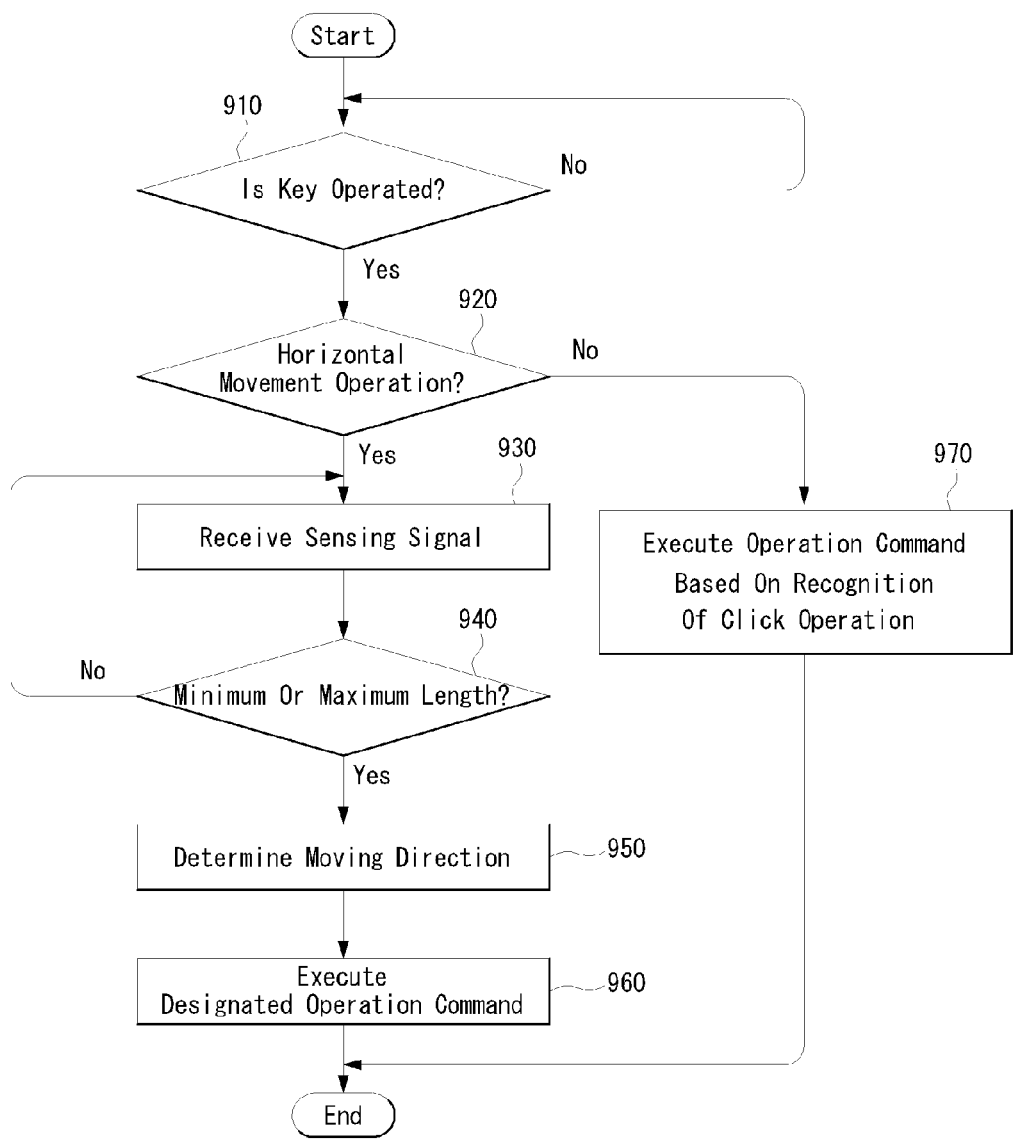
FIG. 9 is a flow diagram illustrating the flow of a key input method according to the embodiment of the invention.

FIG. 9 is a flow diagram illustrating the flow of a key input method according to the embodiment of the invention. FIG. 10 is a graph illustrating a sensing signal inputting operation with the movement of the slider according to the embodiment of the invention.

Referring to FIG. 9, the control unit 130 determines whether a key is operated in step 910.

When it is determined that the key is operated, the control unit 130 determines whether the operation is a horizontal movement operation in step 920. This determination can be performed depending on whether the sensing signal is input from the movement sensing unit 115. As shown in FIG. 10, in case of the horizontal movement operation, the length of the elastic band 250 (or the entire peripheral length of the elastic band 250 and the tact switch 260, where the elongation ratio of the elastic band 250 is 0 and thus the length of the elastic band is not changed) will be start its increase. When it is determined that the operation is the horizontal movement operation, the control unit 130 controls the sensing unit 120 to be activated and then detects the sensing signal input from the sensing unit 120 in step 930. For example, the sensors of the sensing unit 120 may be turned on under the activation control of the control unit 130.

As described in step 920, it is described in this embodiment that the user selectively carries out one of the horizontal movement operation of the slider 230 and the vertical movement operation of the key unit 100, but the horizontal movement operation and the vertical movement operation may be combined to diversify the input information based on the user's operation. This will be described later in detail.

Figure 10:
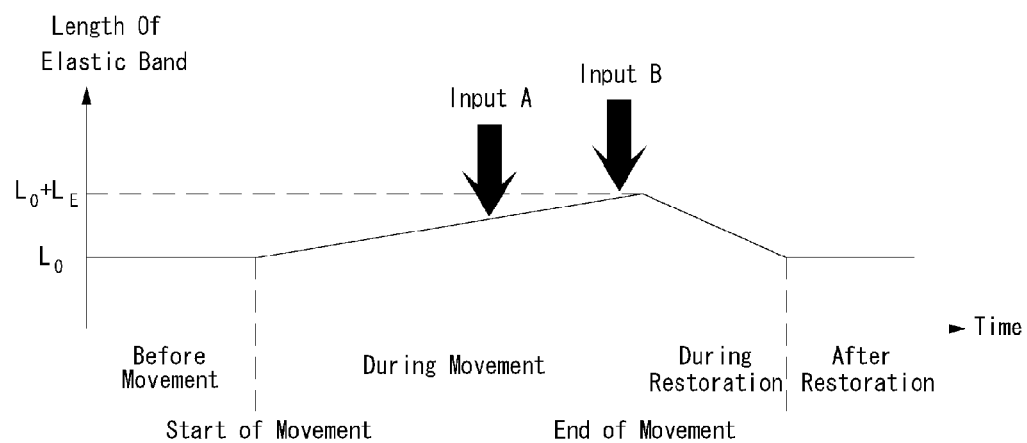
FIG. 10 is a graph illustrating a procedure of inputting a sensing signal based on the horizontal movement of a slider according to the embodiment of the invention.

As shown in FIG. 10, the length of the elastic band 250 (or the entire peripheral length of the elastic band 250 and the tact switch 260, which is true in the following description) increases with the movement of the slider 230 and the sensing unit 120 outputs the sensing signal in the course of the increase of the length of the elastic band 250.

When the horizontal movement in one direction of north, south, east, and west is carried out, the sensing signal is input from one sensor. When the horizontal movement in a diagonal direction is carried out, the sensing signal is input from two sensors. FIG. 10 shows that the sensing signals are sequentially input from two sensors at the time of the horizontal movement in the diagonal direction, but the sensing signals may be simultaneously input.

In FIG. 10, $L_0$ represents the initial value of the length of the elastic band 250 or the entire peripheral length of the elastic band 250 and the tact switch 260 and $L_0+L_E$ represents the maximum value of the length increasing with the elongation ratio of the elastic band 250 and/or the pulling of the trigger 860. The maximum value may vary in the horizontal movement in the diagonal direction of the slider 230 and the horizontal movement in the directions of north, south, east, and west. When the maximum value varies, the length increasing with the horizontal movement in the directions of north, south, east, and west is designated as the maximum value or the length increasing with the horizontal movement in the diagonal direction is designated as the maximum value. When the length increasing with the horizontal movement in the diagonal direction is great and is designated as the maximum value and the user carries out the horizontal movement in the directions of north, south, east, and west, the horizontal movement may be ended and the movable contact portion 830 may come in contact with the start contact portion 810 again, in the state where the movable contact portion 830 ends the contact with the start contact portion 810 but does not come in contact with the end contact portion 820. In this case, the horizontal movement may be recognized on the basis of whether the length is restored to the minimum length (that is, whether the movable contact portion comes in contact with the start contact portion 810 again in the state where it does not come in contact with the end contact portion 820) and the direction of the horizontal movement may be recognized on the basis of the sensing signals in the meantime. The base 210 and the like may be formed so that the elongation length of the elastic band 250 and the entire peripheral length of the elastic band 250 and the tact switch 260 are the same in the horizontal movement in the north, south, east, and west directions and the horizontal movement in the diagonal direction.

In step 940, the control unit 130 determines whether the elastic band 250 is currently elongated to the maximum length (for example, whether the movable contact portion comes in contact with the end contact portion 820) or whether the elastic band 250 is restored to the minimum length (that is, whether the horizontal movement is ended and the movable contact portion comes in contact with the start contact portion 810 again in the state where the movable contact portion does not come in contact with the end contact portion 820). When the slider 230 horizontally moves to the maximum length (that is, horizontally moves in the north, south, east, and west directions or in the diagonal directions), the movable contact portion 830 of the tact switch 260 comes in contact with the end contact portion 820 to end the operation of the signal counter, and the control unit 130 can refer to this. When the maximum movement distance in the diagonal directions is greater than the maximum movement distance in a specific direction and the maximum movement distance in the diagonal directions is designated as the maximum distance, the slider 230 may not move over the maximum distance (that is, horizontally only moves in a specific direction) but may be restored to the original position. In this case, the movable contact portion comes in contact with the start contact portion 810 again in the state where the movable contact portion does not come in contact with the end contact portion 820, whereby the operation of the signal counter may be ended and the control unit 130 may refer to this.

When the elastic band 250 is not elongated to the maximum length or is not restored to the minimum length, the control unit waits for the reception of other sensing signals in step 930.

However, when the elastic band 250 is elongated to the maximum length or is restored to the minimum length, the control unit determines the moving direction of the slider 230 in step 950. As described above, the moving direction of the slider 230 can be determined by the opposite direction of the position of the sensor outputting the sensing signal.

In step 960, the control unit 130 controls its elements to perform an operation corresponding to the operation command (such as inputting a specific character/numeral, selecting a functional menu, and selecting a direction key) based on the determined moving direction of the slider 230.

When it is determined in step 920 that the key operation is not a horizontal movement operation but a vertical movement operation (for example, a click operation), the control unit controls the elements to perform an operation corresponding to the operation command based on the click operation in step 970.

The example where the key unit 100 selectively performs the horizontal movement and the vertical movement is described hitherto with reference to FIG. 9.

However, by combining the horizontal movement and the vertical movement of the key unit 100, it is possible to input a larger number of information pieces based on the user's operation. For example, when the slider 230 vertically moves after the horizontal input operation and when the slider 230 horizontally moves after the vertical input operation, different information pieces may be recognized. In this case, only when the sensing signal from the sensing unit 120 is sensed with the horizontal movement of the slider 230 but the vertical movement operation is input (that is, the sensing signal is reserved until the vertical movement operation), the sensing signal may be recognized as an effective sensing signal.

Hereinafter, the method of enabling the input of various information corresponding to the user's operation by combining the horizontal movement and the vertical movement of the key unit 100 will be described specifically on the basis of the time points of inputting signals.

According to the invention, the time points when the sensing signal and the vertical input signal are input after the movable contact portion 830 is separated from the start contact portion 810 are as follows.

After the movable contact portion 830 is separated from the start contact portion 810, the sensing signal may be sensed earlier than the vertical input signal. Alternatively, after the movable contact portion 830 is separated from the start contact portion 810, the vertical input signal may be sensed earlier than the sensing signal. Alternatively, before the movable contact portion 830 is separated from the start contact portion 810, the vertical input signal may be input These cases are processed on the basis of the sensing signal or the vertical input signal input at or after the time point when the movable contact portion 830 comes in contact with the end contact portion 820. As described above, depending on how to determine maximum value of the length of the elastic band 250 or the entire peripheral length of the elastic band 250 and the tact switch 260, the horizontal movement may be ended and the movable contact portion 830 may come in contact with the start contact portion 810 again in the state where the movable contact portion does not come in contact with the end contact portion 820. The processing method of this case can be easily understood from the above description.

In another case, in the entire cycle from the time point when the movable contact portion 830 is separated from the start contact portion 810 to the time point when the movable contact portion comes in contact with the end contact portion 820, the vertical input signal may not be sensed. In this case, the control unit 130 does not perform the process of the input signal as the result of the user's operation just after the movable contact portion 830 comes in contact with the end contact portion 820, but performs the corresponding process when the vertical input signal is input.

These methods are not associated with the input order of the vertical input signal and the sensing signal, but the input order of the vertical input signal and the sensing signal may be considered. For example, when the sensing signal is input (that is, the horizontal movement is completed) after the vertical input signal is input, a, b, c, or d can be input depending on the moving direction of the sliders 230. When the vertical input signal is input after the sensing signal is input, p, q, r, or s can be input depending on the moving direction of the sliders 230.

As another example, in a secret number input system of banks or a secret number input system of a digital door lock, the number of applicable secret numbers (that is, the usage range of a single button) can increase up to double or more by considering the input order of the vertical signal input and the sensing signal input, and the security effect can be enhanced by diversifying and complicating security elements with an exposure-limited operation such as vertical input or horizontal movement.

Figure 11:
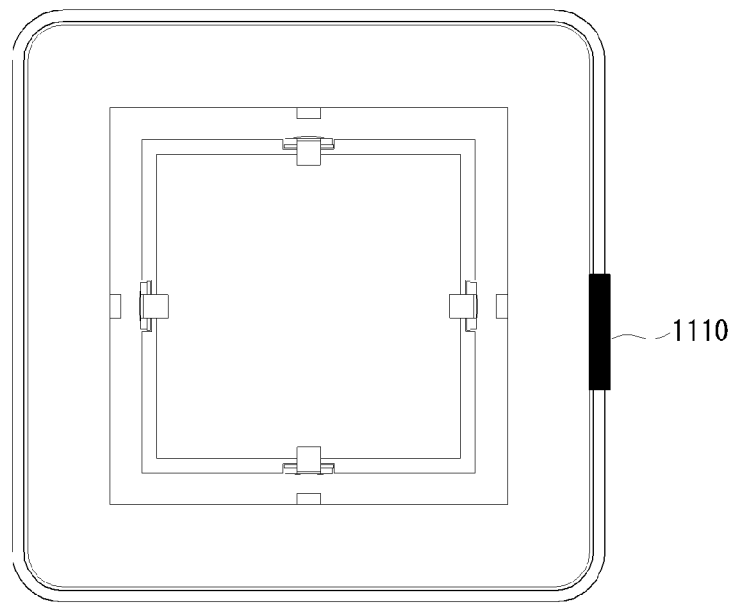
FIG. 11 is a plan view of a key input unit according to another embodiment of the invention.

FIG. 11 is a plan view of a key input unit according to another embodiment of the invention.

Unlike the configuration of the movement sensing unit 115 described above, an example where both ends of the elastic band 250 are fixed using a tension sensing unit 1110 is shown in FIG. 11.

The tension sensing unit 1110 may be a sensor that senses and outputs the force with which both ends of the elongated elastic band 250 are separated from each other when the elastic band 250 is elongated with the horizontal movement of the slider 230.

The tension sensing unit 1110 outputs a sensing signal when it senses the force based on the elongation of the elastic band 250, and the control unit 130 can recognize the horizontal movement of the slider 230 on the basis of the sensing signal input thereto.

Alternatively, the tension sensing unit 1110 may be a variable resistor outputting a resistance value or a current value corresponding to the separation of both ends of the elongated elastic band 250 from each other when the elastic band 250 is elongated with the horizontal movement of the slider 230. The control unit 130 can recognize the horizontal movement of the slider 230 on the basis of the resistance value or the current value output from the tension sensing unit 1110.

In this case, the control unit 130 determines that the slider 230 horizontally moves with reference to the information input from the tension sensing unit 1110, and activates the sensing unit 120. Then, when a signal representing that the slider 230 is restored to the original position or a signal representing that the slider 230 moves up to the maximum distance is input from the tension sensing unit 1110, the control unit 120 deactivates the sensing unit 120 and determines the horizontal movement direction of the slider 230 in consideration of the positions of the sensors outputting the sensing signals.

Figure 12:
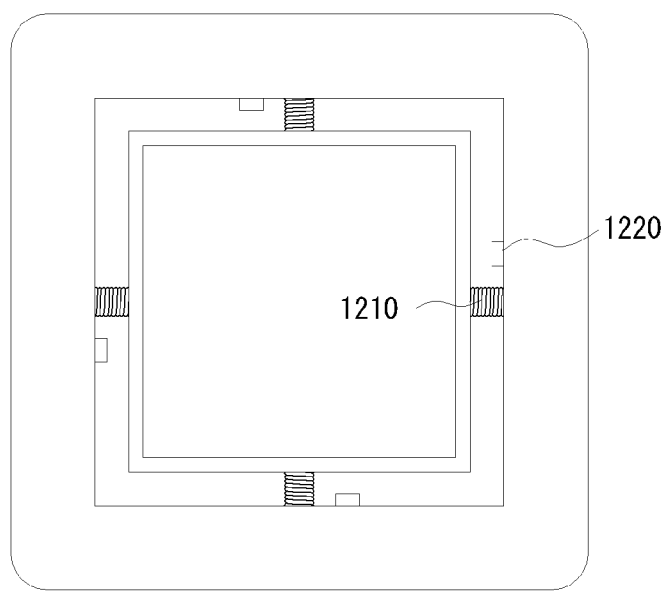
FIG. 12 is a plan view of the key input unit according to another embodiment of the invention

FIG. 12 is a plan view of a key input unit according to still another embodiment of the invention.

As shown in FIG. 12, the pressure sensor 220 shown in FIG. 2 and the like is replaced with a distance sensor 1220. It is shown in the drawing that the distance sensor 1220 is disposed in the slider 230, but it may be disposed in the base 210. The distance sensor 1220 is disposed in a groove formed in the base 210 or the slider 230 and is thus protected from the rapid movement of the slider 230.

The distance sensor outputs a sensing signal when the distance from the corresponding side wall of the base 210 is equal to or less than a reference value. Here, the reference value may be set to 0 (zero) so as to detect the time point when they come in complete contact with each other or may be set to 0.5 mm so as to detect the closeness within a predetermined range. The reference value can be determined variously depending on the design method and the operation characteristic.

The slider 230 and the base 210 may be separated from each other by a predetermined distance using an elastic member 1210. When the slider 230 moves in a specific direction, it is obvious that the slider 230 can be restored to its original position with the elastic force of the elastic member 1210.

In some cases, the elastic member 1210 may be replaced with a sensor (such as a bended terminal) having elasticity or the like.

The sensors disposed in the base 210 may be arranged in the outer portion of the key unit, that is, in the inner peripheral surface of a groove in which the key unit is disposed. In this case, the sensors can be activated with a pressure applied to the outer side wall of the slider 230 or protrusions formed on the outer side wall due to the horizontal movement of the slider 230.

Figure 13:
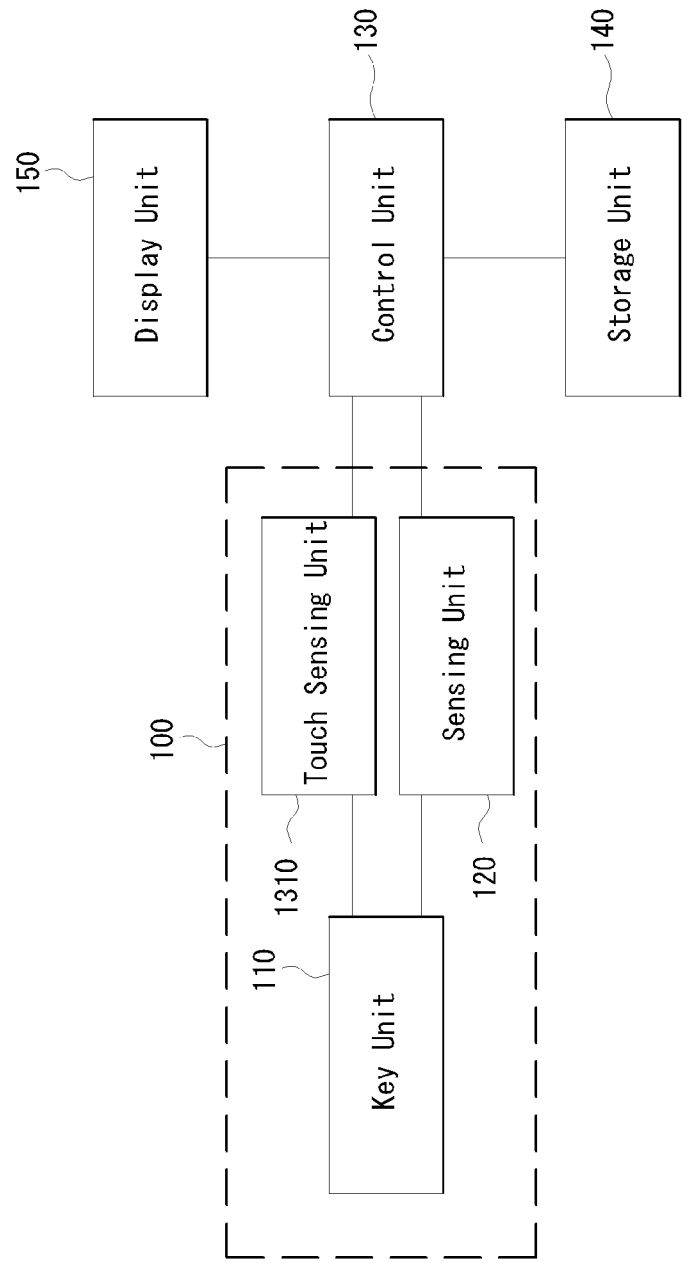
FIGS. 13 and 14 are block diagrams illustrating the configurations of a digital processor according to other embodiments of the invention.
Figure 14:
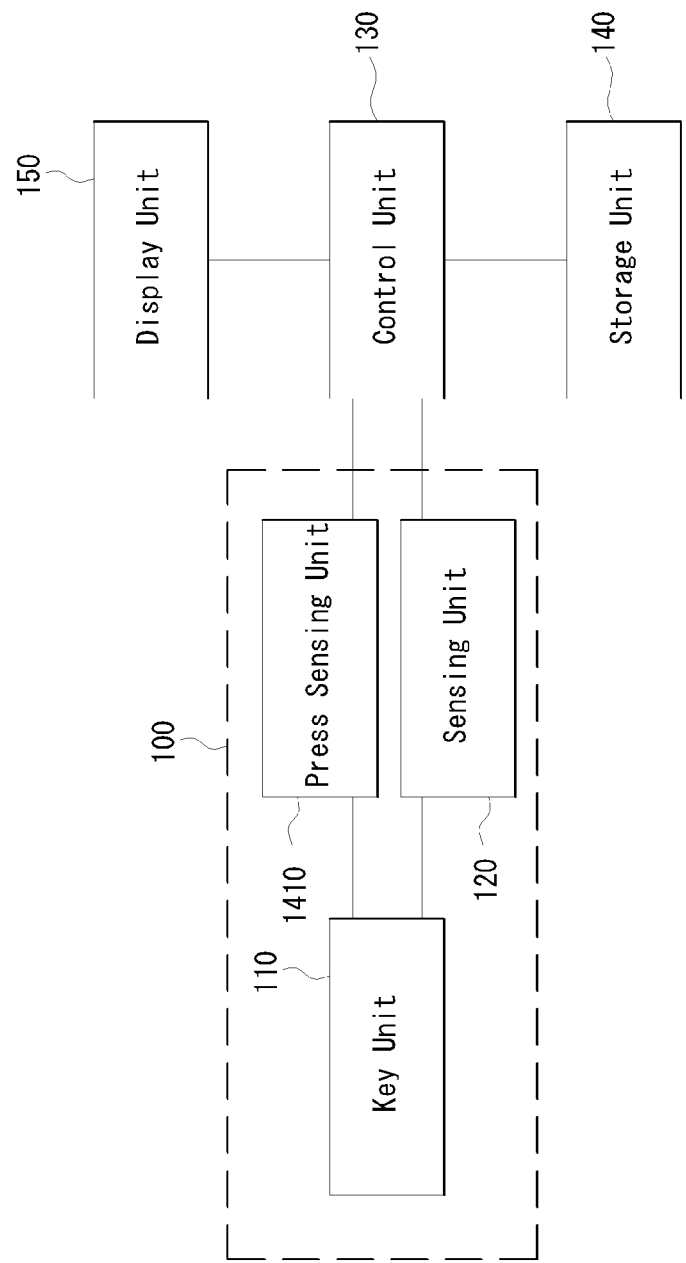

FIGS. 13 and 14 are block diagrams illustrating the configurations of digital processors according to other embodiments of the invention.

The movement sensing unit 115 or the tension sensing unit 1110 can be replaced with a touch sensing unit 1310 shown in FIG. 13 or a press sensing unit 1410 shown in FIG. 14.

The touch sensing unit 1310 shown in FIG. 12 includes a touch sensor, and the touch sensor senses the touch of a user's finger on the key cover and outputs the corresponding sensing signal. This configuration uses the fact that a user's finger should necessarily come in contact with the key in order to operate the key.

The control unit 130 controls the sensing unit 120 to be in an activated state while the sensing signal is being input from the touch sensor (that is, while the user's finger is in contact).

The press sensing unit 1410 shown in FIG. 14 outputs information corresponding to the user's operation (that is, click operation) of vertically moving the key. That is, the user can vertically move a key and then move the key in a direction corresponding to a desired command.

The control unit 130 controls the sensing unit 120 to be in the activated state while the sensing signal is being input from the press sensing unit 1410 (that is, while the user is pressing the key).

The sensors may be activated in a predetermined delay time after information is input from the touch sensing unit 1310 or the press sensing unit 1410, depending on conditions such as initial distances of the sensors and other operation types.

Figure 15:
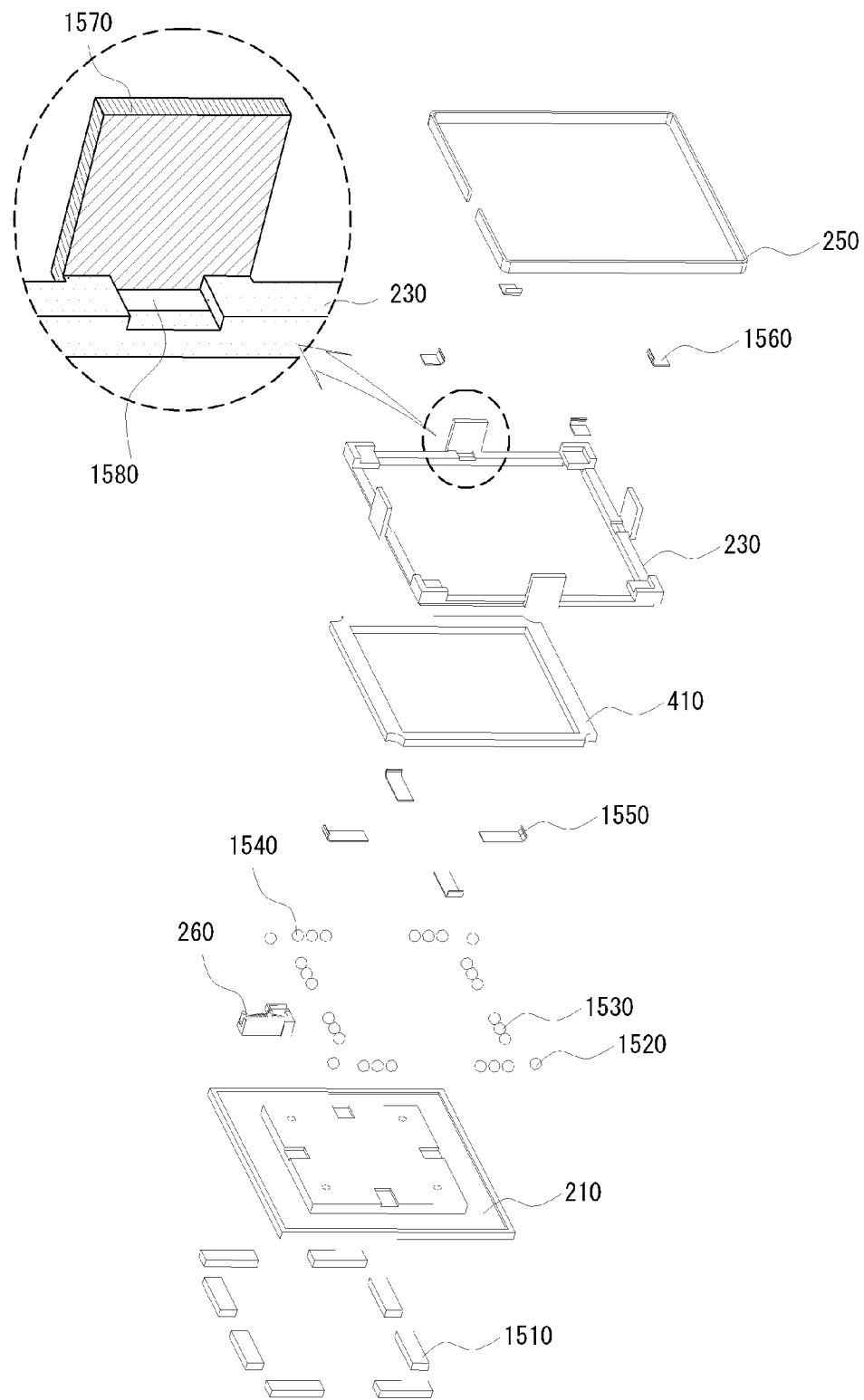
FIG. 15 is a coupling perspective view illustrating a key input unit according to still another embodiment of the invention.
Figure 16:
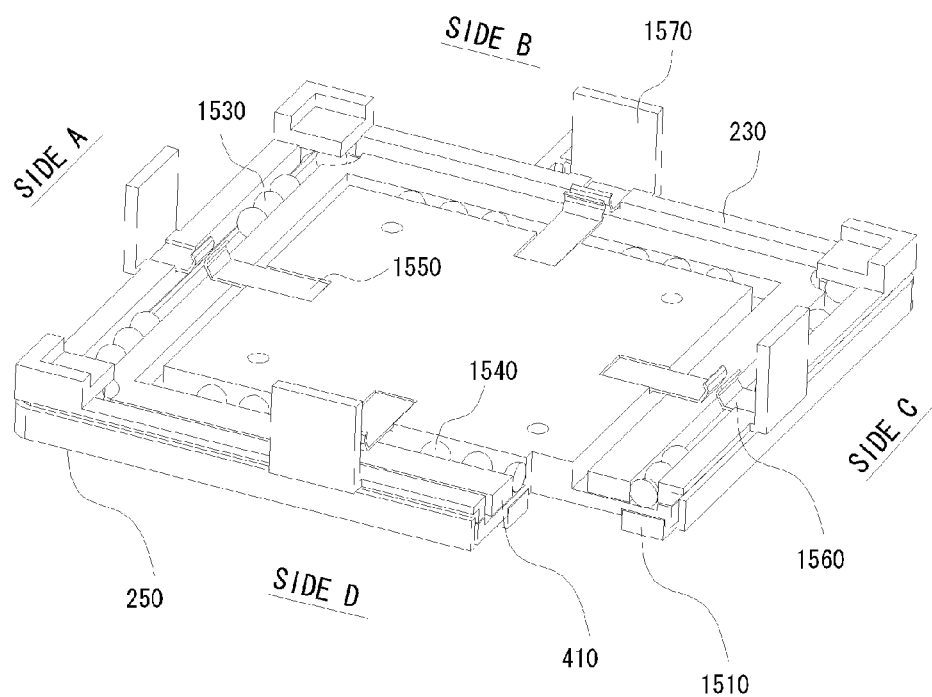
FIG. 16 is a coupling perspective view illustrating the key input unit according to still another embodiment of the invention.

FIG. 15 is a coupling perspective view illustrating a key input unit according to still another embodiment of the invention. FIG. 16 is a coupling perspective view illustrating the key input unit according to the still another embodiment of the invention. FIG. 17 is a diagram illustrating operations of the key input unit according to the still another embodiment of the invention.

As shown in FIGS. 15 and 16, the key input unit 100 includes magnets 1510, a base 210, bearings 1520, 1530, and 1540, a first contact portion 1550, a frame 410, a slider 230, a second contact portion 1560, an elastic band 250, and a tact switch 260.

The magnet 1510 is fixed to the bottom of the base 210 and serves as a retainer holding the positions of the bearings 1520, 1530, and 1540 located on the top of the base 210.

The bearings 1520, 1530, and 1540 reduce the side frictional force between the slider 230 and the frame 410 and between the frame 410 and the base 210 at the time of the horizontal movement of the slider 230.

The bearings 1520, 1530, and 1540 are disposed between the base 210 and the slider 230 and include a vertical bearing 1520 reducing the frictional force with the base 210 at the time of the horizontal movement of the slider 230, a first horizontal bearing 1530 reducing the side frictional force with the frame 410 at the time of the horizontal movement of the slider 230, and a second horizontal bearing 1540 reducing the side frictional force between the frame 410 and the base 210 at the time of the horizontal movement of the slider 230. As shown in FIG. 16, the first horizontal bearing 1530 is disposed between the frame 410 and the slider 230, and the second horizontal bearing 1540 is disposed between the base 210 and the frame 410. The first horizontal bearing 1530 and the second horizontal bearing 1540 are arranged in directions not overlapping with each other. For example, when the first horizontal bearing 1530 is arranged in side A and side C, the second horizontal bearing 1540 is arranged in side B and side D. The arrangement of the first horizontal bearing 1530 and the second horizontal bearing 1540 can be variously changed.

The magnets are disposed below the bearings 1520, 1530, and 1540 so as to restore the bearings 1520, 1530, and 1540 to the original positions after the horizontal movement of the slider 230. Since the key input unit 100 according to the invention has a small operating stroke, the bearing balls of the bearings 1520, 1530, and 1540 are always pulled by the magnets and the bearings are restored to the original positions by the magnetic force after the horizontal movement of the slider 230. Accordingly, a particularly retainer is not necessary.

The first contact portion 1550 is disposed on the protruding portion of the base 210 and comes in contact with the second contact portion 1560 disposed on the slider 230 at the time of the horizontal movement of the slider 230. The first contact portion 1550 and the second contact portion 1560 may be embodied by the variously-shaped sensors described in the above-mentioned embodiments. The first contact portion 1550 and the second contact portion 1560 may be formed of metal and current may be made to flow when the first contact portion 1550 comes in contact with the second contact portion 1560, whereby the contact of the first contact portion 1550 with the second contact portion 1560 can be recognized.

FIGS. 15 and 16 show the slider 230 lighter than the sliders described in the above-mentioned embodiments. That is, the slider 230 may be embodied in a cover shape, but may be embodied with a small thickness so as to be disposed in the outer portion of the base. The total weight can be reduced with the decrease in weight of the slider 230, thereby the decrease in initial activation force.

The slider 230 has a structure coupled to the key cover (key top) disposed on the top surface of the key input unit 100. That is, as shown in FIG. 15, supports 1570 are formed at predetermined positions on the outer surface of the slider 230 and the key cover (key top) is located in an inner space defined by the supports 1570. Alternatively, supports 1570 formed in the slider 230 may be inserted into and coupled to grooves formed in the key cover. Alternatively, the key cover may be located in an inner space defined by the supports 1570 of the slider 230 and protrusions formed in the key cover may be inserted into and coupled to holes 1580 formed I the slider 230.

FIG. 17 shows the operation states of the key input unit 100. (a) of FIG. 17 shows a state where the slider 230 does not horizontally move, (b) of FIG. 17 shows a state where the slider 230 moves to the west, (c) of FIG. 17 shows a state where the slider 230 moves to the north, and (d) of FIG. 17 shows a state where the slider moves to the north-east When the slider 230 moves in a specific direction, as described above, the elastic band 250 can be elongated with a predetermined elongation ratio or the moving space of the slider 230 can be guaranteed by the coil spring in the tact switch 260 even with the elongation ratio of the elastic band 250 of 0.

As shown in (b) of FIG. 17, when the slider 230 moves to the west, the frame 410 also moves to the west with the first horizontal bearing 1530 and the side frictional force between the frame 410 and the base 210 is reduced by the second horizontal bearing 1540 at the time of the movement of the frame 410. At this time, the control unit 130 can recognize that the slider 230 moves to the west by the contact between the first contact portion 1550 and the second contact portion 1560 located in the east.

As shown in (c) of FIG. 17, when the slider 230 moves to the north, the side frictional force between the slider 230 and the flame 410 is reduced by the first horizontal bearing 1540. At this time, the control unit 130 can recognize that the slider 230 moves to the north by the contact between the first contact portion 1550 and the second contact portion 1560 located in the south.

As shown in (d) of FIG. 17, when the slider 230 moves to the north-east, the frame 410 also moves to the east with the first horizontal bearing 1530 and the side frictional force between the frame 410 and the base 210 is reduced by the second horizontal bearing 1540 at the time of the movement of the frame 410. The side frictional force between the slider 230 and the frame 410 is reduced by the first horizontal bearing 1530 at the time of the movement to the north. At this time, the control unit 130 can recognize that the slider 230 moves to the north-east by the contact between the first contact portion 1550 and the second contact portion 1560 located in the west and the south.

Figure 18:
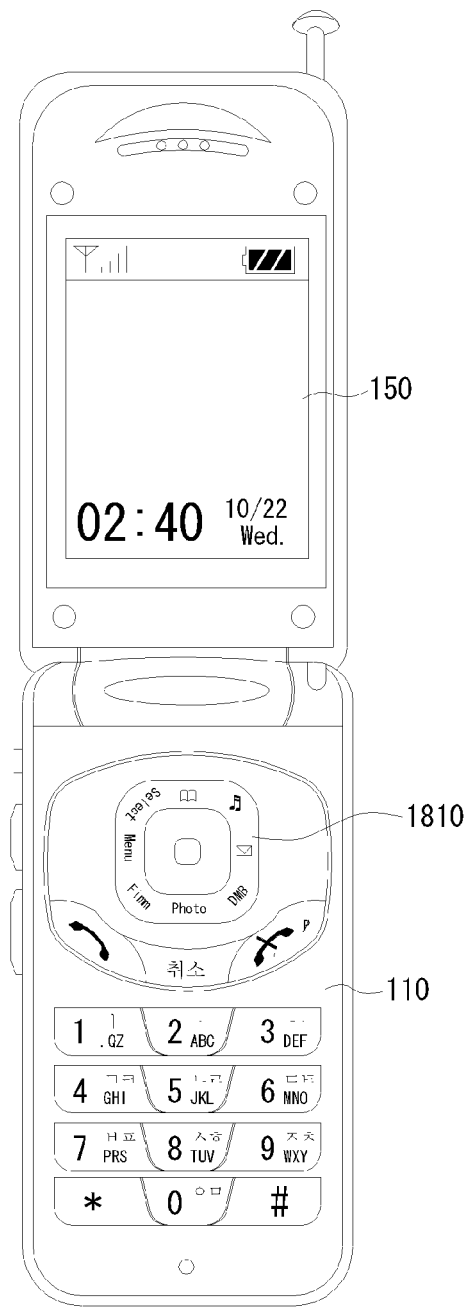
FIGS. 18 and 19 are diagrams illustrating examples of a digital processor mounted with the key input unit according to the embodiments of the invention.
Figure 19:
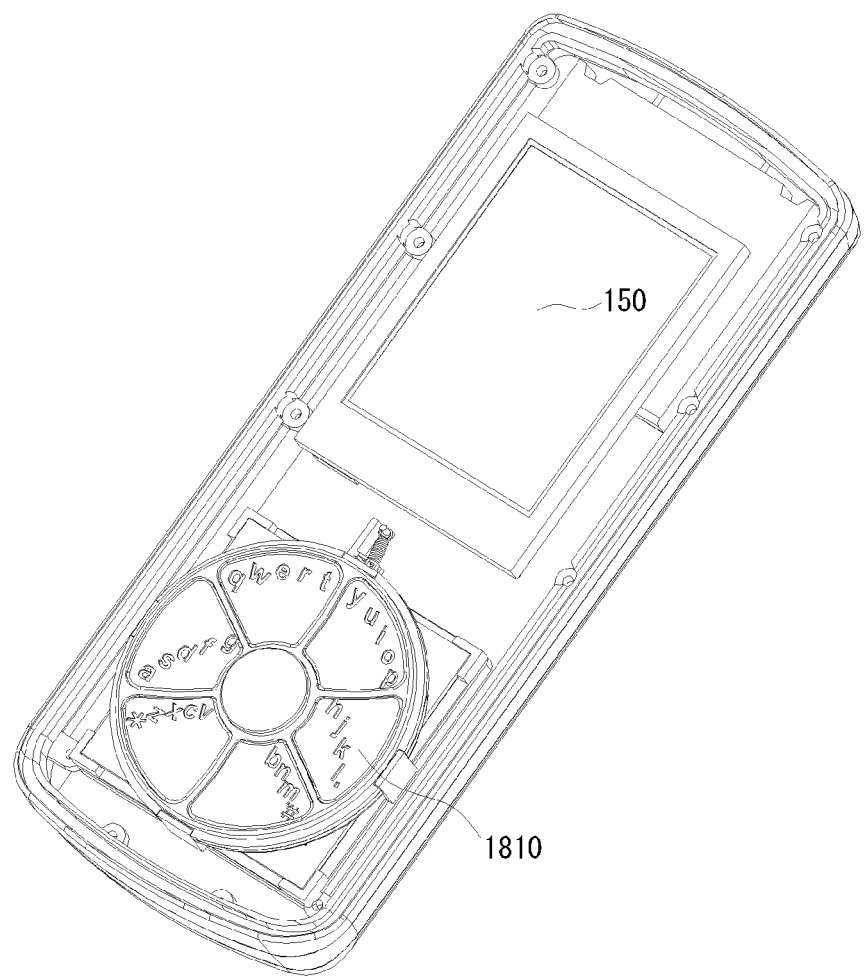

FIGS. 18 and 19 are diagrams illustrating examples of a digital processor mounted with the key input unit according to the embodiments of the invention.

A key employing the key input unit can designate specific functions in 8 directions as shown in FIG. 18 and can designate specific functions in 6 directions (or 8 directions and 6 vertical input buttons) as shown in FIG. 19. The number of directions of which the specific function is designated by the key can be freely set and embodied and can be embodied so as to perform a click operation with the vertical movement A user can cause the key employing the key input unit to horizontally move in a specific direction, whereby a function menu is executed. When a specific function is additionally given to a rotational operation (that is, the sequential change of the horizontal movement directions), a user can execute more functional menus using a single key.

In addition, when buttons for inputting characters/numerals are embodied by the key input unit, the same functions can be embodied using a smaller number of buttons. Accordingly, it is possible to reduce the arrangement area for the buttons.

The above-mentioned key input method may be embodied as computer-readable codes in a computer-readable recording medium. The computer-readable recording medium includes all kinds of recording mediums in which data are stored readable by a computer system. Examples of the computer-readable recording medium include a ROM, a RAM, a CD-ROM, a magnetic tape, a floppy disk, and an optical data storage device and also include a type embodied in the form of carrier waves (for example, transmission through the Internet). The computer-readable codes distributed in systems connected via a network may be stored and executed in a distributed manner in the computer-readable recording medium. Functional programs, codes, and code segments for embodying the above-mentioned method will be easily obtained by programmers skilled in the art.

According to the invention, it is possible to reduce the number of keys by increasing the number of information to be input by the use of a single key.

It is also possible to maintain an operation feeling (tact sense) of a key even when the single key performs plural functions (for example, selectively inputting plural characters/functions.

It is also possible to enhance a recognition rate of information input by the use of a key or a user's operation command.

it is also possible to decrease the number of keys to decrease the size of a digital processor and/or to increase a display area.

While the invention has been described with reference to the exemplary embodiments, it will be understood by those skilled in the art that the invention can be modified and changed in various forms without departing from the spirit and scope of the invention described in the appended claims.

What is claimed is:

1. A key unit for inputting a user's operation command corresponding to a moving direction, comprising:
    a base that is fixed at the central position of the key unit;
    a slider that horizontally moves in parallel to the horizontal plane of the base by the user's operation;
    a frame that supports the slider so as to horizontally move;

a restoration unit that gives a resistive force against the horizontal movement of the slider and restores the horizontally-moved slider to an original position;

at least one outer horizontal bearing disposed at a predetermined position between the frame and the slider; and at least one inner horizontal bearing disposed at a predetermined position between the frame and the central portion of the base, wherein the inner horizontal bearing and the outer horizontal bearing are located in the opposite directions from the central portion, and wherein a magnet that restores one or more of the inner horizontal bearing, the outer horizontal bearing, and a vertical bearing disposed between the bottom of the slider and the top surface of the base, which have moved, to the original position is disposed below the base.

2. The key unit according to claim 1, wherein the frame is disposed between the base and the slider and the base and the slider come in vertical contact with each other along outer side surfaces of the frame.

3. The key unit according to claim 1, further comprising an information plate coupled to the top of the slider so as to sense the vertical movement of the key unit by the user's operation.

4. The key unit according to claim 3, wherein the information plate is formed of one or more of a touch pad, a touch screen, a PCB (Printed Circuit Board), and an FPC (Flexible Printed Circuit).

5. The key unit according to claim 1, wherein the restoration unit includes:
an elastic band that surrounds both the outer side surfaces of the base and the slider in a C shape; and
a movement sensing unit that fixes both ends of the elastic band.

6. The key unit according to claim 1, further comprising:
an elastic band that is inserted into a C-shaped groove formed in the base and the slider so as to surround both the base and the slider; and
a movement sensing unit that fixes both ends of the elastic band.

7. The key unit according to claim 5, further comprising n sensors (where n is a natural number) that are arranged in an inner peripheral portion of the slider formed in a loop shape.

8. The key unit according to claim 7, wherein the n sensors are activated in response to a sensing signal from the movement sensing unit which has sensed the elongation of the elastic band resulting from the horizontal movement of the slider.

9. The key unit according to claim 1, wherein the central portion of the base is higher than the outer peripheral portion and the central portion is inserted into an inner hole of the slider formed in a loop shape.

10. The key unit according to claim 9, wherein the restoration unit is an elastic body that separates the outer peripheral portion of the central portion from the inner peripheral portion of the slider by a constant distance.

11. The key unit according to claim 9, further comprising n sensors (where n is a natural number) that are arranged in the outer peripheral portion of the central portion or the inner peripheral portion of the slider.

12. The key unit according to claim 7 or 11, wherein the sensors are one or more of a contact sensor, a pressure sensor, and a distance sensor.

13. The key unit according to claim 5 or 6, wherein the movement sensing unit is one or more of a tact switch, a tension sensor, a variable resistor, and an elastic terminal.

14. The key unit according to claim 5 or 6, wherein the elastic band is formed of a material of which the elongation ratio is equal to or less than a predetermined value.

15. The key unit according to claim 7 or 11, further comprising a press sensing unit that senses a press state corresponding to the vertical movement of the key unit,
wherein the n sensors are activated in response to a press state sensing signal output from the press sensing unit.

16. The key unit according to claim 7 or 11, further comprising:
at least one key cover that is coupled to the slider and disposed above the key unit; and
a touch sensing unit that senses a user's touch of the key cover,
wherein the n sensors are activated in response to a touch state sensing signal output from the touch sensing unit.

17. The key unit according to claim 1, wherein supports are formed at predetermined positions in the outer portion of the slider and at least one key cover is disposed in a space defined by the supports.

18. The key unit according to claim 1, wherein supports are formed at predetermined positions in the outer portion of the slider and the supports are inserted into and coupled to a groove formed in at least one key cover.

19. The key unit according to claim 1, wherein holes or protrusions and supports are formed at predetermined positions in the slider, at least one key cover is disposed in a space defined by the supports, and protrusions or holes formed in the bottom of the key cover are coupled to the holes or protrusions of the slider.

20. A digital processor having at least one key for inputting a user's operation command corresponding to a moving direction, comprising:
a key unit; and
a control unit that recognizes the opposite direction of arrangement positions or the opposite direction of a vector sum of one or more sensors outputting a sensing signal as the moving direction of the slider on the basis of the sensing signal input from the key unit,
wherein the key unit includes:
a base that is fixed at the central position of the key unit;
a slider that horizontally moves in parallel to the horizontal plane of the base by the user's operation;
a frame that supports the slider so as to horizontally move;
a restoration unit that gives a resistive force against the horizontal movement of the slider and restores the horizontally-moved slider to an original position;
at least one outer horizontal bearing disposed at a predetermined position between the frame and the slider; and
at least one inner horizontal bearing disposed at a predetermined position between the frame and the central portion of the base,
wherein the inner horizontal bearing and the outer horizontal bearing are located in the opposite directions from the central portion, and
wherein a magnet that restores one or more of the inner horizontal bearing, the outer horizontal bearing, and a vertical bearing disposed between the bottom of the slider and the top surface of the base, which have moved, to the original position is disposed below the base.

21. The digital processor according to claim 20, wherein the restoration unit includes:
an elastic band that surrounds both the outer side surfaces of the base and the slider in a C shape; and a movement sensing unit that fixes both ends of the elastic band.

22. The digital processor according to claim 21, further comprising n sensors (where n is a natural number) that are arranged in an inner peripheral portion of the slider formed in a loop shape.

23. The digital processor according to claim 20, wherein the restoration unit includes:
an elastic band that is inserted into a C-shaped groove formed in the base and the slider so as to surround both the base and the slider; and
a movement sensing unit that fixes both ends of the elastic band.

24. The digital processor according to claim 20, wherein the frame is disposed between the base and the slider and the base and the slider come in vertical contact with each other along outer side surfaces of the frame.

25. The digital processor according to claim 20, further comprising an information plate coupled to the top of the slider so as to sense the vertical movement of the key unit by the user's operation.

26. The digital processor according to claim 20, wherein the central portion of the base is higher than the outer peripheral portion and the central portion is inserted into an inner hole of the slider formed in a loop shape.

27. The digital processor according to claim 26, wherein the restoration unit is an elastic body that separates the outer peripheral portion of the central portion from the inner peripheral portion of the slider by a constant distance.

28. The digital processor according to claim 26, further comprising n sensors (where n is a natural number) that are arranged in the outer peripheral portion of the central portion or the inner peripheral portion of the slider.

29. The digital processor according to claim 21, wherein the n sensors are activated in response to a sensing signal from the movement sensing unit which has sensed the elongation of the elastic band resulting from the horizontal movement of the slider.

30. The digital processor according to claim 21, wherein the movement sensing unit is one or more of a tact switch, a tension sensor, a variable resistor, and an elastic terminal.

31. The digital processor according to claim 21, wherein the elastic band is formed of a material of which the elongation ratio is equal to or less than a predetermined value.

32. The digital processor according to claim 22 or 28, further comprising a press sensing unit that senses a press state corresponding to the vertical movement of the key unit, wherein the n sensors are activated in response to a press state sensing signal output from the press sensing unit.

33. The digital processor according to claim 22 or 28, further comprising:
at least one key cover that is coupled to the slider and disposed above the key unit; and
a touch sensing unit that senses a user's touch of the key cover,
wherein the n sensors are activated in response to a touch state sensing signal output from the touch sensing unit.

34. The digital processor according to claim 20, wherein supports are formed at predetermined positions in the outer portion of the slider and at least one key cover is disposed in a space defined by the supports.

35. The digital processor according to claim 20, wherein supports are formed at predetermined positions in the outer portion of the slider and the supports are inserted into and coupled to a groove formed in a key cover.

36. The digital processor according to claim 20, wherein holes or protrusions and supports are formed at predetermined positions in the slider, a key cover is disposed in a space defined by the supports, and protrusions or holes formed in the bottom of the key cover are coupled to the holes or protrusions of the slider.

37. A non-transitory computer readable storage medium having recorded thereon a program which can be read by a digital processor and in which command words executable by the digital processor are materially described so as to carry out a key input method, the key input method comprising:
receiving a horizontal movement start signal of a slider;
receiving a sensing signal from one or more sensors disposed in a key unit; and
recognizing the opposite direction of arrangement positions or the opposite direction of a vector sum of one or more sensors outputting the sensing signal as the moving direction of the slider,
wherein the key unit includes:
a base that is fixed at the central position of the key unit;
the slider that horizontally moves in parallel to the horizontal plane of the base by the user's operation;
a frame that supports the slider so as to horizontally move;
a restoration unit that gives a resistive force against the horizontal movement of the slider and restores the horizontally-moved slider to an original position;
at least one outer horizontal bearing disposed at a predetermined position between the frame and the slider; and
at least one inner horizontal bearing disposed at a predetermined position between the frame and the central portion of the base,
wherein the inner horizontal bearing and the outer horizontal bearing are located in the opposite directions from the central portion, and
wherein a magnet that restores one or more of the inner horizontal bearing, the outer horizontal bearing, and a vertical bearing disposed between the bottom of the slider and the top surface of the base, which have moved, to the original position is disposed below the base.

38. The non-transitory computer readable storage medium according to claim 37, wherein the sensors disposed in the key unit are activated when the horizontal movement start signal of the slider is received.

\* \* \* \* \*